US011880877B2

(12) United States Patent
Stout et al.

(10) Patent No.: US 11,880,877 B2
(45) Date of Patent: Jan. 23, 2024

(54) SYSTEM FOR IMAGING AND DETECTION

(71) Applicant: Ghost House Technology, LLC, Wyoming, MI (US)

(72) Inventors: David Paul Stout, Hudsonville, MI (US); Ethan Michael Baird, Comstock Park, MI (US); Tyler Mauer, Grandville, MI (US)

(73) Assignee: Ghost House Technology, LLC, Wyoming, MI (US)

( * ) Notice: Subject to any disclaimer, the term of this patent is extended or adjusted under 35 U.S.C. 154(b) by 662 days.

(21) Appl. No.: 16/560,019

(22) Filed: Sep. 4, 2019

(65) Prior Publication Data
US 2020/0178706 A1    Jun. 11, 2020

Related U.S. Application Data

(63) Continuation-in-part of application No. 16/458,795, filed on Jul. 1, 2019.
(Continued)

(51) Int. Cl.
G06Q 20/40 (2012.01)
G06Q 30/0601 (2023.01)
G06Q 20/20 (2012.01)

(52) U.S. Cl.
CPC ....... *G06Q 30/0635* (2013.01); *G06Q 20/208* (2013.01); *G06Q 20/40145* (2013.01)

(58) Field of Classification Search
CPC . G06Q 30/0641; G06Q 30/0601–0645; G06Q 30/06; G06Q 30/0633–0635
(Continued)

(56) References Cited

U.S. PATENT DOCUMENTS 8,482,413 B2    7/2013    Martin
9,470,532 B2    10/2016   Pellow
(Continued)

FOREIGN PATENT DOCUMENTS

AU      763922 B2    8/2000
CN   107424032 A    12/2017
(Continued)

OTHER PUBLICATIONS

Zimmerman, Thomas G. "Tracking Shopping Carts Using Mobile Cameras Viewing Ceiling-Mounted Retro-Reflective Bar Codes" Fourth IEEE International Conference on Computer Vision Systems. IEEEXplore.com (Year: 2006).*
(Continued)

*Primary Examiner* — Allison G Wood
*Assistant Examiner* — Katherine A Barlow
(74) *Attorney, Agent, or Firm* — The Dobrusin Law Firm, PC

(57) ABSTRACT

A system for enabling in store routing of a user generated shopping list using existing store cameras and artificial intelligence and machine learning is provided. The system uses a pixelbuffer comparison of items imaged in real time to compared to a database of machine learned images. The system further provides item recognition and detection through machine learning so as to improve a shoppers experiences. The system and method further includes drone assistance means and radio signal item and biological detection so as to improve accuracy. Other features to improve guidance and accuracy include landmark navigation and masking to improve accuracy of item recognition and detection. The system may be a standalone kiosk.

4 Claims, 23 Drawing Sheets

Related U.S. Application Data

(60) Provisional application No. 62/839,234, filed on Apr. 26, 2019, provisional application No. 62/828,153, filed on Apr. 2, 2019, provisional application No. 62/794,058, filed on Jan. 18, 2019, provisional application No. 62/792,044, filed on Jan. 14, 2019, provisional application No. 62/776,671, filed on Dec. 7, 2018.

(58) Field of Classification Search
USPC .............................................. 705/26.1–27.2
See application file for complete search history.

(56) References Cited

U.S. PATENT DOCUMENTS

| | | | |
|---|---|---|---|
| 9,760,778 B1* | 9/2017 | Wakim | G06V 10/95 |
| 9,911,290 B1 | 3/2018 | Zalewski | |
| 10,055,853 B1 | 8/2018 | Fisher | |
| 10,127,438 B1 | 11/2018 | Fisher | |
| 10,282,722 B2 | 5/2019 | Huang | |
| 10,803,292 B2* | 10/2020 | Srivastava | H04N 23/60 |
| 10,832,305 B1* | 11/2020 | Woodbeck | G06F 16/51 |
| 10,991,028 B1* | 4/2021 | Aubrey | G06Q 30/0631 |
| 2003/0158796 A1 | 8/2003 | Balent | |
| 2004/0181461 A1 | 9/2004 | Raiyani | |
| 2008/0004892 A1* | 1/2008 | Zucker | G06Q 30/0641 |
| | | | 705/14.5 |
| 2013/0080278 A1 | 3/2013 | Daily | |
| 2013/0218721 A1 | 8/2013 | Borhan | |
| 2013/0332273 A1 | 12/2013 | Gu | |
| 2014/0316916 A1 | 10/2014 | Hay | |
| 2015/0012396 A1 | 1/2015 | Puerini | |
| 2015/0039458 A1 | 2/2015 | Reid | |
| 2015/0109451 A1 | 4/2015 | Dhankhar | |
| 2015/0170256 A1 | 6/2015 | Pettyjohn | |
| 2015/0186982 A1 | 7/2015 | Higgins | |
| 2015/0199816 A1 | 7/2015 | Freeman | |
| 2015/0206121 A1 | 7/2015 | Joseph | |
| 2015/0324882 A1 | 11/2015 | Ouimet | |
| 2016/0063610 A1 | 3/2016 | Argue | |
| 2016/0109281 A1 | 4/2016 | Herring | |
| 2016/0110703 A1* | 4/2016 | Herring | G07G 1/0045 |
| | | | 705/23 |
| 2016/0110786 A1 | 4/2016 | Herring | |
| 2016/0189276 A1 | 6/2016 | Batra | |
| 2016/0258762 A1 | 9/2016 | Taylor | |
| 2016/0364785 A1 | 12/2016 | Wankhede | |
| 2017/0163882 A1 | 6/2017 | Piramuthu | |
| 2017/0300999 A1 | 10/2017 | Wilkinson et al. | |
| 2017/0323376 A1 | 11/2017 | Glaser | |
| 2018/0005309 A1 | 1/2018 | Croy et al. | |
| 2018/0096566 A1* | 4/2018 | Blair, II | G06Q 20/209 |
| 2018/0204204 A1 | 7/2018 | Giraudo | |
| 2018/0218443 A1 | 8/2018 | Vikram | |
| 2018/0232796 A1 | 8/2018 | Glaser | |
| 2018/0253708 A1* | 9/2018 | Mohanakrishnan | G06Q 30/06 |
| 2018/0341505 A1 | 11/2018 | Ebersohn | |
| 2019/0043003 A1 | 2/2019 | Fisher | |
| 2019/0080277 A1* | 3/2019 | Trivelpiece | G06Q 20/3224 |
| 2019/0095984 A1 | 3/2019 | Perks et al. | |
| 2019/0156273 A1 | 5/2019 | Fisher | |
| 2019/0156275 A1 | 5/2019 | Fisher | |
| 2019/0156276 A1 | 5/2019 | Fisher | |
| 2019/0156277 A1 | 5/2019 | Fisher | |
| 2019/0156506 A1 | 5/2019 | Fisher | |
| 2019/0228457 A1 | 7/2019 | Wu | |
| 2019/0378108 A1* | 12/2019 | Edwards | G06Q 30/04 |
| 2020/0000248 A1 | 1/2020 | Jain | |
| 2020/0082373 A1* | 3/2020 | Kozak | G07G 1/0081 |

FOREIGN PATENT DOCUMENTS

| | | |
|---|---|---|
| CN | 107767170 A | 3/2018 |
| FR | 2 975 811 A1 | 11/2012 |

OTHER PUBLICATIONS

Tonioni, A. et al. "A deep learning pipeline for product recognition on store shelves," 2018 IEEE International Conference on Image Processing, Applications and Systems (IPAS), pp. 25-31, doi: 10.1109/IPAS.2018.8708890. (Year: 2018).*

Wu, B. F., et al., "An intelligent self-checkout system for smart retail," 2016 International Conference on System Science and Engineering (ICSSE), Puli, Taiwan, pp. 1-4, doi: 10.1109/ICSSE.2016.7551621. (Year: 2016).*

Fernandes, T., et al. "The effect of self-checkout quality on customer satisfaction and repatronage in a retail context." Serv Bus 11, pp. 69-92. https://doi.org/10.1007/s11628-016-0302-9 (Year: 2017).*

Csuri, C. et al.: "Towards an Interactive High Visual Complexity Animation System", Computer Graphics and Interactive Techniques, ACM, 2 Penn Plaza, Suite 701, New York, NY 10121-0701, USA, Aug. 1, 1979, pp. 280-299, XP058225813, DOI: 10.1145/800249.807458,ISBN: 978-0-89791-004-0.

European Extended Search Report dated Feb. 3, 2022, Application No. 19825053.2.

Will Broome, Never get lost in the dairy aisle again: 'Supermarket satnav' guides shoppers around using the most logical route, DailyMail.com, Nov. 8, 2016.

Giles Turnbull, Supermarket's Map App Shows Quickest Routes to Things On Your List, http://techland.time.com; May 27, 2011.

Erik Minass, aisleRunner, May 27, 2011.

Levy, Nat. "Google acquires French machine learning startup Moodstocks in imagae-recognition push" Geekwire.com (Year: 2016).

Non-Final Office Action dated Apr. 27, 2022, Application No. U.S. Appl. No. 16/458,795.

Weightman, Gavin, "The History of the Bar Code" SmithsonianMag.com (Year: 2015).

Final Office Action dated Sep. 23, 2022, U.S. Appl. No. 16/458,795.

Extended European Search Report dated May 9, 2022, Application No. 19892768.3.

Bo, L. et al., "Object Recognition with Hierarchical Kernel Descriptors," CVPR 2011, Colorado Springs, CO, USA, pp. 1729-1769, doi: 10.1109/CVPR.2011.5995719. (Year: 2011).

Eitel, A., et al., "Multimodal Deep Learning for Robust RGB-D Object Recognition," 2015 IEEE/RSJ International Conference on Intelligent Robots and Systems (IROS), Hamburg, Germany, pp. 681-687, doi: 10.1109/IROS.2015.7353446. (Year: 2015).

Non-Final Office Action dated Feb. 24, 2023, U.S. Appl. No. 16/458,795.

"Focal Point", Dictionary.com. https://www.dictionary.com/browse/focal point. Accessed Jun. 7, 2023 (Year: 2023).

"Foreground", Dictionary.com. https://www.dictionary.com/browse/foreground. Accessed Jun. 7, 2023 (Year: 2023).

Final Office Action dated Jun. 21, 2023, U.S. Appl. No. 16/458,795.

Notice of Allowance and Fee(s) Due dated Sep. 13, 2023, Application No. U.S. Appl. No. 16/458,795.

Bobbit, R., et al. "Visual item verification for fraud prevention in retail self-checkout," 2011 IEEE Workshop on Applications of Computer Vision (WACV), Kona, HI USA, pp. 585-590 (Year 2011).

Chinese First Office Action & Search Report dated Oct. 17, 2023, Application No. 201980056860.8.

\* cited by examiner

| My List |
|---|
| Milk |
| Bread |
| Cereal |
| Soda |

| My Route ~ |
|---|
| Bakery *by Asile 1 |
| Aisle 3 |
| Aisle 8 |
| Aisle 5 |

STORE SKU  205

| Product Name | SKU | STOCK | LOCATION |
|---|---|---|---|
| Milk | sku 001 | 10 | Aisle 8 |
| Bread | sku 002 | 15 | Bakery *by Asile 1 |
| Cereal | sku 003 | 20 | Aisle 3 |
| Soda | sku 004 | 90 | Aisle 5 |

AISLE PRIORITY Bases on Entrance  207

| AISLE NAME | SKU | | List items |
|---|---|---|---|
| Bakery | sku 002 | | Bread |
| Aisle 1 | N/A | | N/A |
| Aisle 2 | N/A | | N/A |
| Aisle 3 | sku 003 | | Cereal |
| Aisle 4 | N/A | | N/A |
| Deli | N/A | | N/A |
| Aisle 8 | sku 001 | | Milk |
| Aisle 7 | N/A | | |
| Aisle 6 | N/A | | |
| Aisle 9 | N/A | | |
| Aisle 5 | sku 004 | | Soda |

*Fig-2*

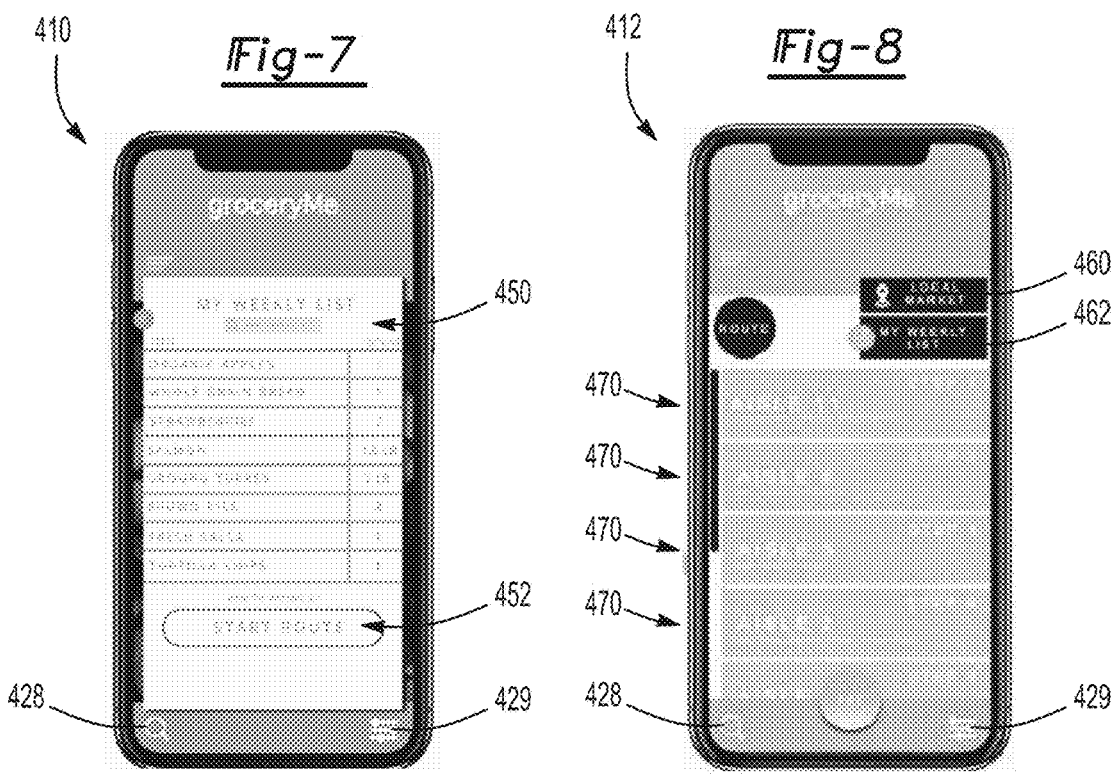
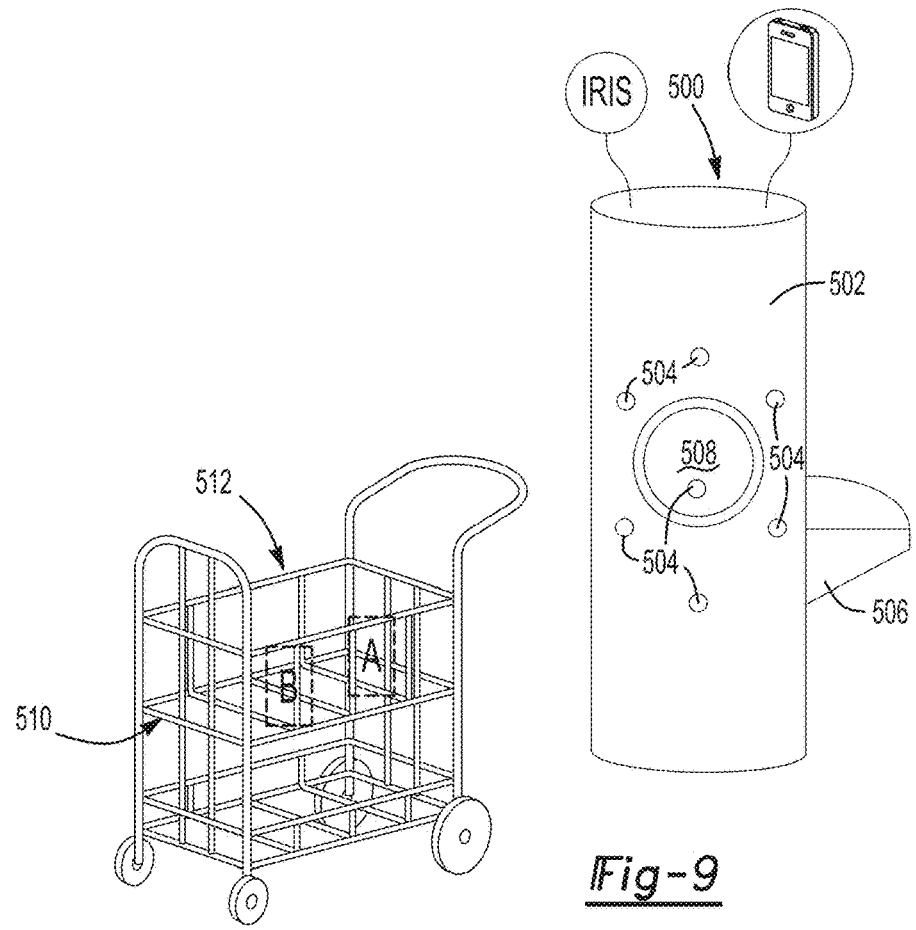

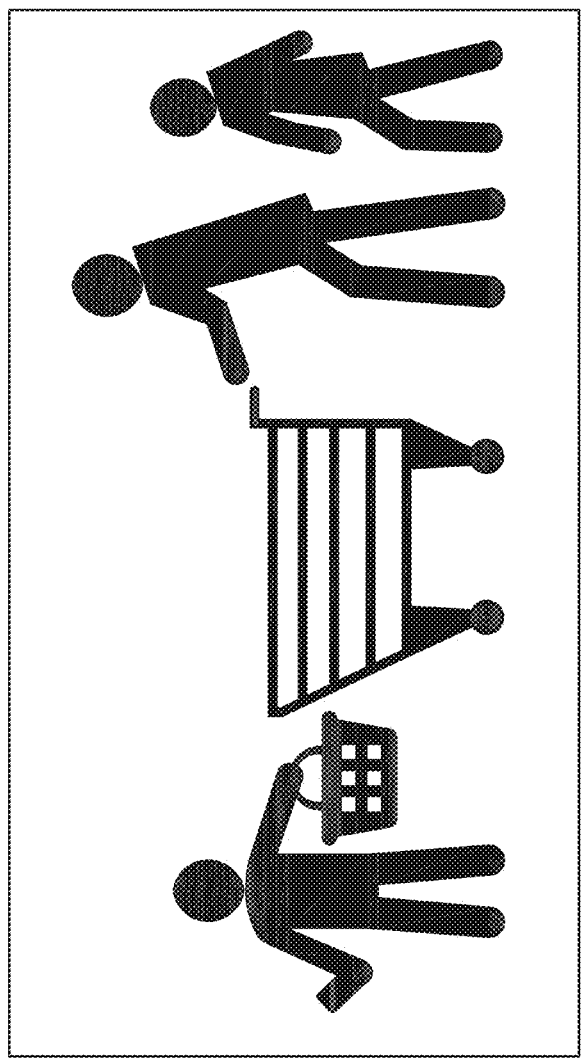
Fig-26
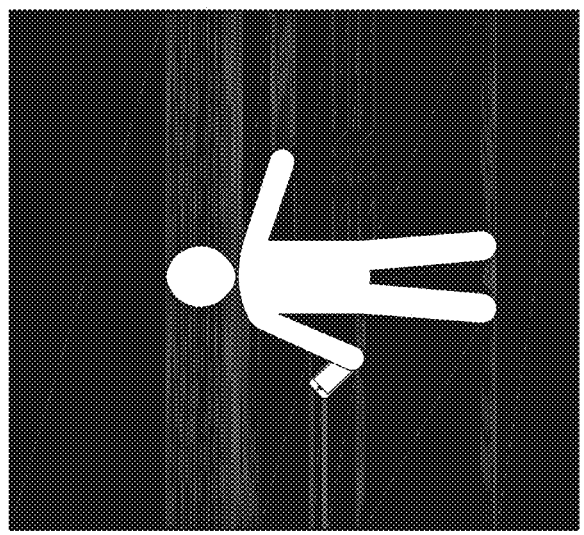

SYSTEM FOR IMAGING AND DETECTION

CROSS REFERENCE TO RELATED APPLICATIONS

The application claims priority and benefit to U.S. provisional application Ser. No. 62/691,927 filed on Jun. 29, 2018, U.S. provisional application Ser. No. 62/828,153 filed on Apr. 2, 2019, U.S. provisional application Ser. No. 62/720,560 filed on Aug. 21, 2018, U.S. provisional application Ser. No. 62/776,671 filed on Dec. 7, 2018, U.S. provisional application Ser. No. 62/792,044 filed on Jan. 14, 2019, U.S. provisional application Ser. No. 62/794,058 filed on Jan. 18, 2019, U.S. provisional application Ser. No. 62/839,234 filed on Apr. 26, 2019, and U.S. Utility application Ser. No. 16/458,795 filed on Jul. 1, 2019, which are all incorporated herein by reference.

TECHNICAL FIELD

The present specification generally relates to a system and method to aid in item location (such as shopping or warehouse item location and tracking), detection, routing and, more specifically, a system and method for determining the fastest and most efficient route through a store or warehouse using a user generated shopping list and in-store SKU database, machine learning, drone assistance, image recognition and detection for facilitating a faster and more efficient checkout and/or identification process.

BACKGROUND

Shopping lists are well known in the art. People commonly create shopping lists on their mobile devices or using traditional paper. Mobile applications are increasingly used for online shopping and for item retrieval information. Specifically, it is known in the art to visit a store's website to determine if a specific store has an item in stock and what the price per item is. However, these prior known shopping methods are dated and frequently do not provide the most accurate up-to-date information. It is a frequent problem that a user will check an item's supply online to confirm that a product is available, but, after they are at the store, find that the product is unavailable. These existing systems are not updated in real-time and do not use specific physical store database location information and are thus inconvenient to the user.

Accordingly, a need exists for an alternative and effective shopping system and method for creating a list, confirming availability and generating routing information easily accessible to a user. Furthermore, there exists a need to streamline the checkout process when using said system and method.

It is well known in the art to detect the physical presence of beings (humans, animals . . . etc.) and objects (any inanimate object) using various methods such as infrared, sonar . . . etc. However, these methods are incapable of determining additional biophysical information and are often incapable of detecting the presence of anything if it is located behind another physical object.

Accordingly, a need exists for an improved method and system of accurately detecting wavelengths, frequencies and the general presence of beings and things.

SUMMARY

A system for enabling in store routing of a user generated shopping list, the system comprising a global positioning system, the global positioning system determining the location of the user so as to determine a specific store that the user is currently located at, a processor connecting to the SKU database of said specific store, said SKU database including product price, product location and product availability information where said processor is configured determining a most efficient route based on location information exclusively from said specific store SKU database, each product categorized by aisle and/or location and mapping location information on a predetermined store layout map using mapped points so as to determine the fasted route between said mapped points wherein each mapped point designates a specific product location. In some embodiments, the processor connects to the SKU database prior to said user entering store location. The processor may be configured to display on a user display screen product availability information from the global positioning system and the SKU database to the user the availability of a product in the shopping list. It is an option to provide fastest route is provided in a list of instructions including product location information. In some embodiments, the route provided is optimized for efficiency, the system is configured to create multiple list, and/or the user can select which list to shop from. Further, in some embodiments, SKU database information is transmitted to the user in real-time.

In another embodiment, a system is provided allowing a user to check out at a store, the apparatus and system comprising a mobile application allowing a user to generate a shopping list, a kiosk in wireless communication with the mobile application, the kiosk having at least one camera, the at least one camera in communication with a database of leaned images, said database continuously being updated based on prior transactions within and a processor comparing items physically present with said database of images, said processor comparing physically present items with items in said shopping list on user's mobile application, the processor comparing the items within the shopping cart to the shopping list so as to confirm items in shopping cart and/or a corresponding total payment. In some embodiments, the mobile app allows for wireless payment. In other embodiments, the kiosk includes a scale, the scale configured to weigh a variable weight item, the scale configured to transmit weight information to the mobile application. The kiosk may include multiple cameras. The kiosk may be in communication with cameras physically spaced apart from the kiosk itself. Further, the kiosk may be in communication with existing security cameras in a store. In some embodiments, the cameras are depth sensing cameras.

In another embodiment, a system for authenticating items gathered by a user in a store is provided comprising at least one camera in a shopping location of a store, the camera capable of viewing a user and their surroundings in a frame in the shopping location of the store, the camera configured detect a trained item that a user picks up in real-time, the camera only detecting the trained item wherein the trained item is a product with data stored in a database of images corresponding to said store and a processor in communication with the database of images, using machine learning the processor comparing the trained item in real-time to the database of images to determine the specific product. In some embodiments, data collected from the trained item in real-time is stored in the database of images for future use thereby improving the accuracy of the system. Further, it is an option wherein a pixelbuffer comparison is used to authenticate the trained items within the frame. In some embodiments, the processor determines an identifier and a confidence score. The system further may include a mobile application used by the user to generate a shopping list, the processor in communication with the mobile application to confirm that the correct product was added to the user's shopping list by comparing the data collected in real-time to the shopping list. The system may include a mobile application configured to generate a shopping list, the processor in communication with the mobile application to add the specific products to the shopping list.

In another embodiment, system and method for authenticating an item during a checkout process is provided comprising a database of images containing a plurality of database images, the database of images including multiple images of an individual item, at least one camera, the at least one camera configured to take a checkout photo of an item during the checkout process to authenticate the item and an authentication system configured to compare the checkout image to the database images to authenticate the item using pixelbuffer comparison wherein the system is configured to store the checkout image into the database of images so that the checkout image becomes a database image thereby increasing the database of images to improve accuracy and precision by way of machine learning.

In another embodiment, a system and method using artificial intelligence to recognize an item in a store using a mobile device camera the method and system comprising a database of images containing a plurality of database images, the database of images including multiple images of an individual item, the mobile device camera configured to view an image in real-time, a processor in communication with the database of images, the processor configured to compare the image in real-time to the plurality of database images to determine the item the user is pointing the mobile device camera at, and a system configured to allow a user to interact with a recognized item within the application wherein interaction function includes tap, voice, click, and/or gestures.

In another embodiment, a bag configured to weigh items, the bag comprising a holding portion configured to hold product selected by a user while shopping, a weighing device configured to weigh items placed in the holding portion, an accelerometer configured to detect rotation or movement so as to prevent false readings and wherein the bag and corresponding system is configured to zero out the weight reading after the user weighs a first item thereby allowing the user to weigh a second item in the same bag without having to remove the first item from the bag. The bag may also include a processor. In some embodiments, the processor is in communication with a mobile application to transmit weight information regarding a product. The processor may be in wireless communication with a mobile application. They bag may further include storage capacity to store weight information regarding variable weight items contained within the bag. In some embodiments, a sensor for connection and communication with a checkout station at a store.

In another embodiment, a drone assistance system for use in a store configured to assist a user while shopping, the drone assistance system comprising a drone in communication with a mobile device of a user, the drone having light projection features, the drone in communication with a processor, the processor having the specific location in a store of an item and the drone is configured to receive item location from the processor after item location is requested from the user, the drone configured to find said item within a store and illuminate a single item within the store to indicate to the user the items exact location. In some embodiments, the drone includes an onboard camera and a corresponding processor. In some embodiments the processor is configured to perform object detection and recognition through the camera. Further, the process may be configured to perform facial recognition through the camera. In some embodiments, the camera and processor are configured to track users in the store.

In another embodiment, a drone system comprises a shelving unit having a uppermost shelf and a wireless charging pad configured to charge a drone, the wireless charging pad positioned on said uppermost shelf. In some embodiments, the shelving unit is configured to hold items in a store. The shelving units may be arranged so as to form the aisles in a store and power cables may extend through the shelving units so as to power the wireless charging pad.

In yet another embodiment, a system for item imaging, the system comprises a radio transmitter configured to send signals that project onto desired objects or areas, the signals traveling through solid surfaces and creating a return signal when they interact with surfaces or objects that are received by a radio receiver and a processor configured to interpret the signals received by the radio receiver so as to determine if there are additional items behind an object not viewable by a traditional camera. In some embodiments, the system includes at least one camera, the data from the camera and the signals received from the radio receiver combined so as to provide a comprehensive image or accounting for all items within an area.

In another embodiments, a detection system comprises an artificial intelligence program in communication with processor and a radio transmitter, the radio transmitter configured to transmit signals onto an object or a being, a radio receiver configured to receive return waves from said radio transmitter, the processor configured to receive and interpret data received from the radio receiver, the processor in communication with the artificial intelligence program to interpret said data from said return waves, and the processor configured to determine a confidence threshold wherein if the confidence threshold is met, then the processor outputs said data in a predetermined desired format and if the confidence threshold is not met, then the radio transmitter sends a new signal to tighten said data. In some embodiments, the radio transmitter sends signals through objects so as to detect objects not visible by a camera. In some embodiments, the signal is transmitted to a person or animal so as to detect biomagnetism, bodily frequencies and/or bodily wavelengths. In some embodiments, the signal is transmitted to a person or animal so as to set parameters for body function including neuro commands. In some embodiments, said detection of biomagnetism, bodily frequencies and/or bodily wavelengths is collected as data to interpret a frequency of a wave so as to associate it with a specific bodily state. In some embodiments, the specific bodily state is emotion, illness, and/or disease. In some embodiments, the signal transmitted is a Wi-Fi signal. In some embodiments, the predetermined desired formal is a visual representation of a detected object.

In yet another embodiment, a system for landmark navigation within a store, the system comprises a mobile application on a mobile device, the mobile application having a user interface configured to allow the user to select a landmark navigation option, a processor configured to process a route based on the user's shopping list or based on a specific item the user is shopping for and a route matrix evaluating the distance between existing navigation points, if said distance meets or exceed a landmark requirement threshold, then the system inserts a landmark navigation point between qualifying navigation steps thereby informing the user that a specific product is located near a specific landmark. In some embodiments, a visual map is provided to the user with the location of said landmarks. In some embodiments, data is retrieved from at least one in store camera, said data relating to specific location of existing landmarks in a store.

In another embodiments, a system for improving image processing, the system comprises at least one depth sensing camera, the depth sensing camera finding a focal point within a frame, a processor configured to retrieve depth data from the corresponding area in the frame where the focal point is located, the processor configured to use said depth data to determine a background contained within the frame wherein the processor then placing a binary mask over said background so as to block out unnecessary imagery in the camera's field of view thereby improving accuracy. In some embodiments, the mask visually blocks out all imagery aside from said focal point within said frame. In some embodiments, data is only taken from the focal point no blocked out within the frame so as to minimize noise within the frame.

A kiosk for checking out at a store is provided wherein the kiosk includes a main body having a first camera and a second camera both mounted thereto, the first camera and a second camera both in communication with a processor, the first camera configured to detect and authenticate a user and the second camera configured to detect at least one user selected product wherein the processor uses machine learning to compare a preexisting database of images to the data collected by the second camera to accurately detect the user selected product and wherein the processor generates a list of items detected by the second camera. In some embodiments, the first camera is a biometrics camera. In some embodiments, the user is automatically charged when either the first camera or the second camera detect the user walking away, or the user initiates checkout on the kiosk. In some embodiments, the kiosk further includes a display screen. The kiosk further may include a third camera, the third camera configured to view a user cart where the third camera is pointed to view the contents of a shopping cart. The third camera may be in communication with the processor, the processor configured to notify either visually or audibly if an item is left in the user cart.

A system for processing an order is provided having a processor, a first camera in communication with the processor, the first camera and the processor configured to detect that a user is placing an order, an order entry interface, the order entry interface configured to accept an order, the order entry interface in communication with the processor, and a second camera in communication with the first camera and the processor, the second camera spaced apart from the first camera wherein the order entered in the order entry interface is marked incomplete until the user and the ordered item are detected in the same pixelbuffer by either the first camera or the second camera. The first camera and/or the second camera may be a biometrics camera. In some embodiments, payment is complete after the user places an order. In other embodiments, payment is complete when the user walks away from either the first camera or the second camera.

A kiosk for checking out at a store, the kiosk includes a main body having a camera and a display mounted thereto, the camera and the display in communication with a processor, the camera configured to detect and authenticate a user, and the processor configured to use data associated with the user to generate a targeting marketing material to display to the user on the display. In some embodiments, the material displayed to the user is advertising based on the users shopping history. In some embodiments, the user can interact with the display by using gestures, vocal commands, application, and/or physical interaction.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 2 depicts an exemplary chart illustrating the aisle priority system according to one or more embodiments shown and described herein;

FIG. 7 depicts a list display screen screenshot according to one or more embodiments shown and described herein;

FIG. 8 depicts a route display screen screenshot according to one or more embodiments shown and described herein;

FIG. 9 depicts a schematic view of the checkout apparatus and system used when a user is checking out of the store according to one or more embodiments shown and described herein;

FIG. 26 depicts a side-by-side comparison of a camera capturing an original feed versus the feed with an active binary mask according to one or more embodiments shown and described herein;

DETAILED DESCRIPTION

The system, apparatus and method of the present application is two-fold. The first portion relates to a system and method using a mobile application for creating a list and optimizing a route within a store. The second component relates to a checkout system and apparatus configured to streamline the checkout process for the user when the user is using the aforementioned mobile application.

The system and method of the present specification provides for a one-stop-shop for people who shop at stores, particularly grocery stores. From a high level overview, the system and method includes a list creation system, connectivity to global positioning systems (GPS) to determine specific store location information, connectivity to said specific store's SKU system so as to provide real-time availability, location and price information and routing functionality so as to provide the most efficient and fastest route throughout the store using information exclusively retrieved from the specific physical store's SKU database of product information. The route system takes the items on the list generated by the user. When activated, the system determines the fastest route possible for the user to take throughout the store based exclusively on SKU information exclusive to the specific store the user is located at.

Figure 1:
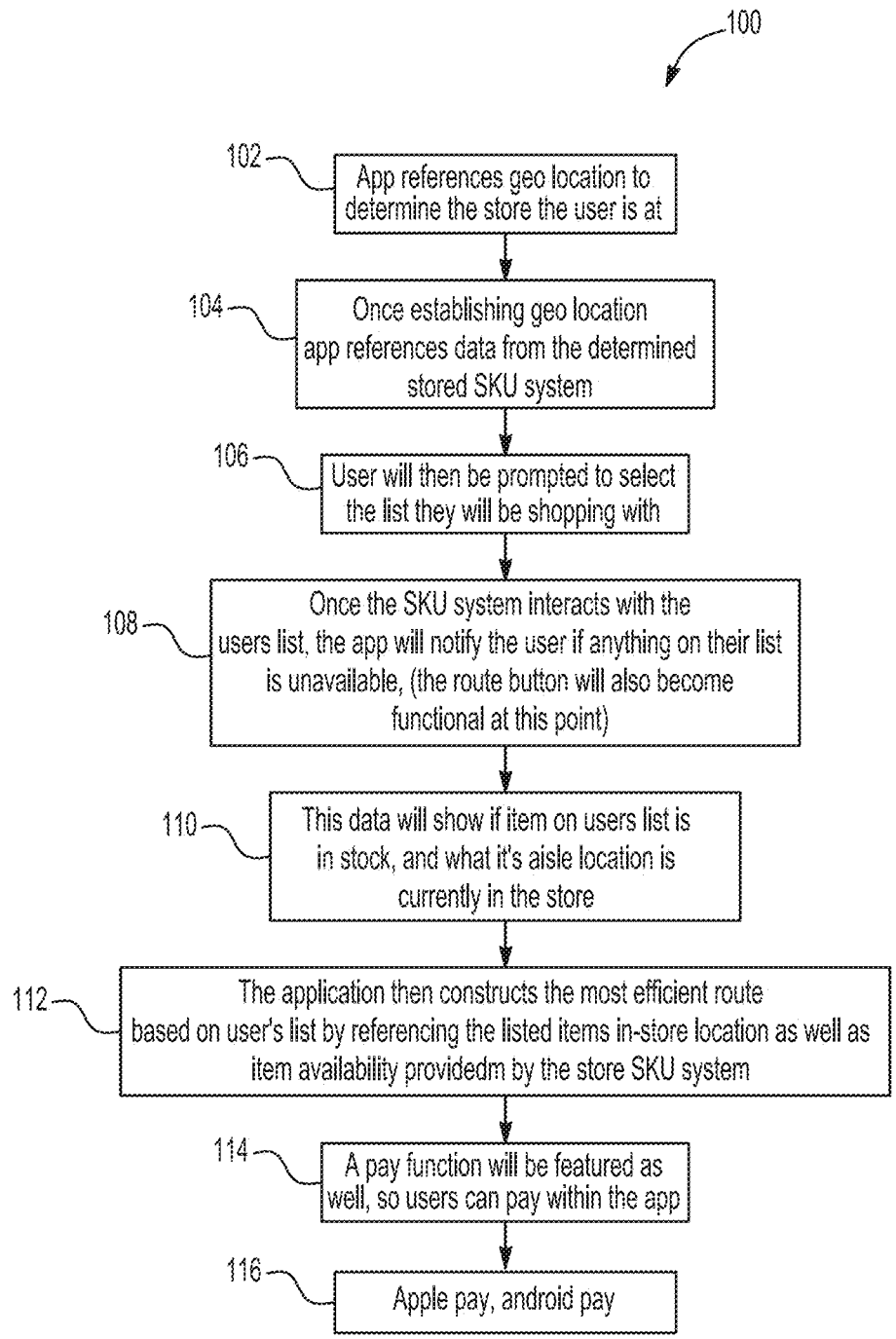
FIG. 1 depicts a flow chart detailing the high-level steps that the system takes according to one or more embodiments shown and described herein.

FIG. 1 discloses a flow chart generally mapping a system or connecting items on a user generated grocery list to a store SKU system by using a mobile application. The system 100 enables a user to create a list, or multiple lists, of items such as grocery items within the mobile application. The user may have several lists and therefore be able to manage multiple lists, share lists with group members or create specific lists for specific events.

At the first step 102, the system is in communication with a GPS to determine the exact geo location of the user. The system references the geo location to determine the specific store that the user is currently located at. At step 104, once the geo location is established, the system references data from the determined store's SKU system. The store SKU system stores information such as product pricing, availability, and location within the store.

The system of the present specification is particularly advantageous in that it allows the system to connect directly to the specific store's SKU system. The SKU system provides live (aka real-time) and fully accurate data about the price, availability, and location of the item in that specific store. Similar systems are not able to provide real-time and accurate data about product availability, pricing, and location since these systems do not connect directly to the specific store's SKU system.

At step 106, the user is prompted to select which list from the plurality of lists within the mobile application that they will be shopping with. At step 108, after the SKU system interacts with the user's selected list, the system will notify the user if anything on their list is unavailable. At step 110, this availability determination happens in real-time and can happen even prior to the user entering the store. This data will show if the item on the user's list is in stock and what its aisle location is currently within the store that the user is located at. Furthermore, a pay system 114 (such as Android® or Apple® pay) may also be provided and available to the user within the mobile application.

The system then determines the most efficient route based on the user's list. At step 112, a route is calculated based on the location of the items on the user's shopping list. This aisle priority system, as discussed in further detail in FIGS. 2 through 4, uses data from the store's SKU system. Specific SKU information of location information within the specific store is communicated to the application.

Figure 3:
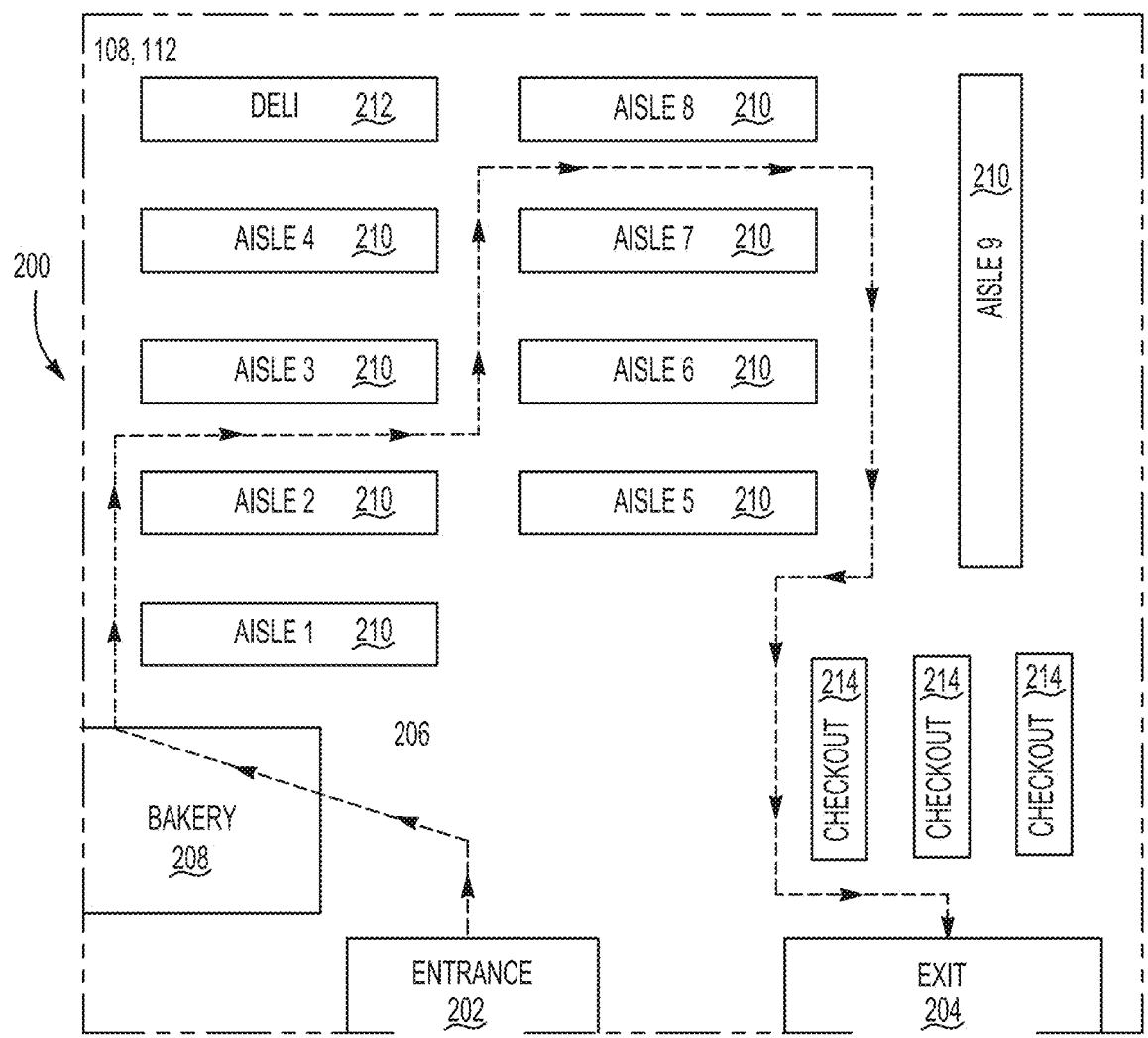
FIG. 3 depicts an exemplary store layout and corresponding route according to one or more embodiments shown and described herein.

The system and application then generates an aisle priority matrix, such as illustrated in FIG. 2, based on the exact location of each specific product. With reference to FIGS. 2 and 3, an item on the user's shopping list is associated directly with a SKU number. Each SKU number in the entire store is associated with a location name, or aisle name. The matrix as illustrated in FIG. 2 categorizes each item on the user's shopping list according to SKU and therefore aisle name. Items are then categorized by aisle name. In this embodiment, all items located in, for example, aisle one, are positioned sequentially within the matrix as illustrated in FIG. 2. This categorization by aisle name of items into groups according to the aisle name is data used to calculate the specific route tailored for the user.

In the example as illustrated in FIG. 2, the user has a list with four items on it including, milk, bread, cereal, and soda. After the system determines which store the user is physically at based on GPS information, each of the items on the user's list are tied to a specific SKU number such as illustrated in matrix 205. The SKU number for each item on the user's list is associated with a specific location, also known as the aisle name. Each item on the user's list is also associated with a quantity, also known as the stock availability.

Data from the matrix 205 is then transferred to the aisle priority system as illustrated in matrix 207. The location information of the matrix as illustrated at 205 is compared to other items on the list in the aisle priority matrix 207. Each product on the user's list is then organized by aisle name and grouped together by said aisle name.

By way of example, as illustrated in the present matrix 207, bread is categorized in the bakery, cereal is categorized as being in aisle 3, milk is categorized as being in aisle 8, and soda is categorized as being in aisle 5. The grouping by product location as illustrated in matrix 207 is then compared with the store layout 200, such as illustrated in FIG. 3. Each store location will have individual store layout maps which will dictate the user's route based on the aisle priority, such as illustrated in matrix 207.

With reference to FIG. 3, the layout 200 dictates that a user, if being most efficient, should start from the entrance 202 and follow the route 206 as dictated by the aisle priority system. In furtherance to the example as illustrated in FIG. 2, the user in this specific example would first stop at the bakery 208 and then proceed through the remainder of the aisles 210, in this specific embodiment, the user starts at the bakery 208, proceeds to aisle 3, then to aisle 8 and finally through aisle 5. The user is then directed to the check out 214 and through the exit 204. In this specific example, the aisle priority would dictate that a user would first get items at the bakery 208 and then would proceed through aisles 1 through 4. The user would then proceed to the deli 212, and then through aisles 8, 7, 6, 5 where items in aisle 9 may be picked up between any of the aisles 7, 6, or 5. It should be noted that the example as illustrated in FIGS. 2 and 3 are merely exemplary and not intended to limit the scope of the present specification.

Figure 4:
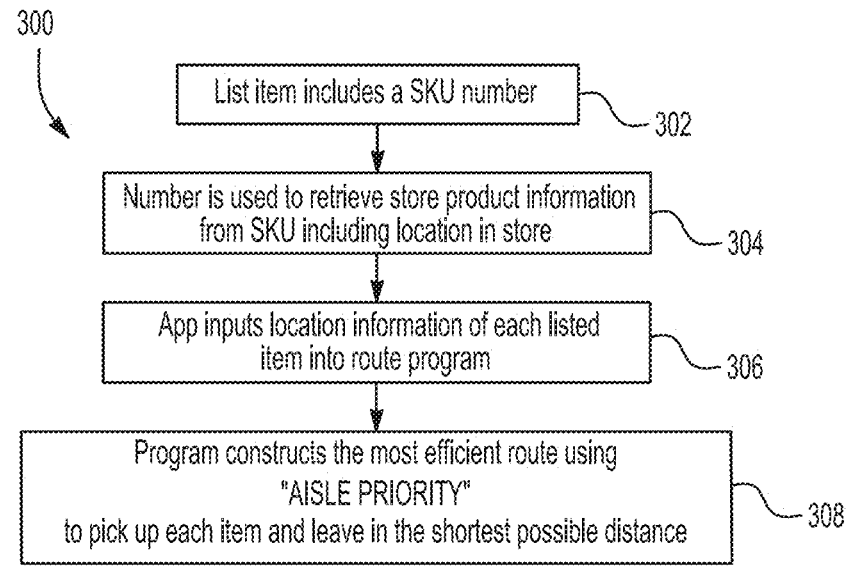
FIG. 4 depicts a flow chart detailing the store SKU connection and processing that the system takes according to one or more embodiments shown and described herein.

FIG. 4 further discusses the SKU and list communication between a store database and processor and the user's mobile device. The flowchart 300 enumerates the steps of first having a list item having a SKU number at step 302, where the number is used to retrieve store product information from the SKU database of that specific store including the location in the store at step 304, the system then inputting information of each of the specific listed items into the aisle priority route system at step 306 and then the system constructing the most efficient route using the aisle priority system, such as described above, to pick up each item and leave in the shortest possible time and distance traveled such as illustrated at item 308.

FIGS. 5 through 8 illustrate exemplary application visuals to be displayed on the user's mobile device. The progression through FIGS. 5 through 8 illustrates a high level flowchart of the screens that will be displayed to the user. An open screen first prompts the user when opening the application. The log-in screen is then displayed to the user so that the user can input log-in information and the user can log into the system to use any of the aforementioned or forgoing applications to the entire system. The hub screen 406 allows the user to connect to the group, the list or route information of a specific store. Screen 408 displays a singular or plurality of lists created by the user, screen 410 illustrates the items contained on said lists and screen 412 displays the route functionality and overview to most efficiently collect the items on the user's list.

Figures 5, 6:
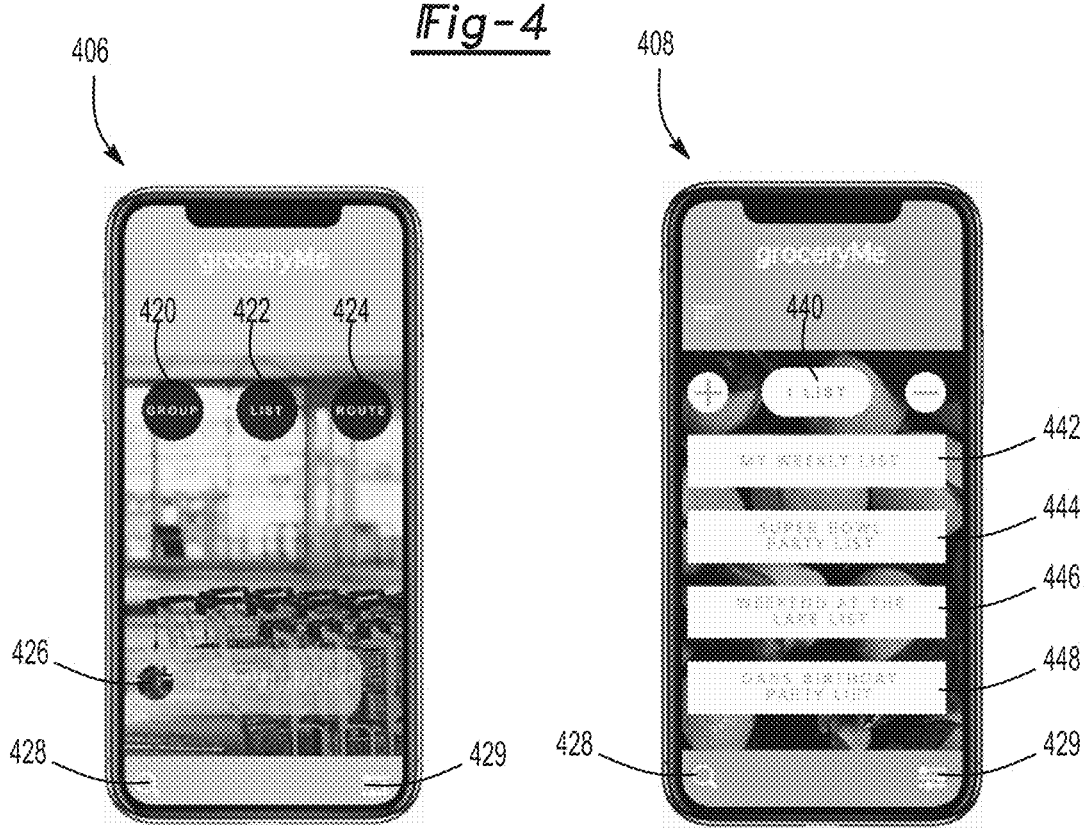
FIG. 5 depicts a hub display screen screenshot according to one or more embodiments shown and described herein.
FIG. 6 depicts a list selection display screen screenshot according to one or more embodiments shown and described herein.

Screen 406, such as illustrated in FIG. 5, displays the hub screen. The hub screen 406 is where the user can access and see all features contained within the system and application. On the hub screen 406, the user can see notifications about sales, adjustments to grocery lists, out of stock items, etc. The user can then also search for items at the search functionality button 428, change their settings, access their lists, access their groups, and enable group functionality at button 424. Button 420 allows the user to change group settings such as who has availability and access to lists. Button 422 allows a user to view the lists, such as illustrated on the list screen 408. Notifications are shown in a notification window as shown at reference numeral 426. Settings information is available at reference numeral 429.

FIG. 6 illustrates the list screen 408. The list screen 408 enables the user to create a new list at reference numeral 440, view a weekly list 442 or view additional specific lists such as indicated at reference numerals 444, 446, 448. The search functionality 428 is also displayed on the list screen 408.

FIG. 7 illustrates the enumerated list of items on the user's grocery list 450. The item name and quantity is listed on the user's list 450. Search functionality 428, as well as settings information 429, is also displayed on the list to route display screen 410. The display screen 410 is displayed once a user selects a list on the list screen 408. The user can scroll through the list and make changes as needed. The list will show the quantity or weight if applicable, as well as detailed name brand specific information. Beneath the list may include a health rating which scores and rates the product information based on nutritional information. The user may then start the route by pressing the start route button 452. By selecting the start route button 452, the system will open a new display screen 412 that shows the most efficient route based on the user's shopping list within the store.

FIG. 8 displays the route functionality display screen 412. The route screen 412 displays local store information 460, as well as the list name 462. Location information for each item or group of items is illustrated at the steps 470. The route function as herein described distinguishes the present functionality and system from the prior art by using its aisle priority system. The routing system of the present specification is an aisle by aisle guide for store walk through to ensure shoppers save time when shopping and avoid wandering through stores in search of a specific item. The route function is bigger and more novel than just an aisle by aisle walk through in that it connects directly with the store using GPS and/or geo location to communicate to the system specifically where the user is. This information determines the specific store that the user is located at. Once the GPS system determines specifically which store the user is at, the GPS system is no longer needed because location information for each specific product is transferred to the system and is based solely on the SKU number within that specific store.

A pay button 472 may also be provided in any of the aforementioned screens. In some embodiments, the user may pay for each item as it is placed in the cart, or may pay for an item using specific technology at a check out enabling a mobile device pay system. Systems may also be provided at checkout which use RFID systems and/or cameras to verify purchases made in the store, such as will be discussed in the foregoing.

The aforementioned mobile application and system allows a user to create a list, and then the mobile application generates the most efficient route for the shopper based on the store's data, and using aisle priority system (all as discussed above and in the attached Figures). Used in combination with the mobile application is a checkout kiosk making the checkout process entirely seamless. The user is permitted within the application using Apple Pay® (or similar programs). In this embodiment, the mobile application accepts payment when the user is positioned at this checkout kiosk (also referred to as the bagging station).

Each kiosk includes a plurality of cameras in stereo which are programmed by linking computers to said cameras. When the computers in each bagging station are linked they will detect shopping items based on the details of the items hue-saturation-value, as well as the item's RGB, and dimensions. If an item is not detected by the camera's robotic vision and it is on the shopper's list, it will create a warning or notification for both the user and the store. Similarly if there are additional items in the user's cart or bag that are not on the user's shopping list, a warning/notification for both the user and the store will occur. This will prevent theft, and accidental over charges. The camera communicates to the application, and the application communicates to the cameras. It is a system of pure communication, and item directory.

Each store capable of working with the mobile application as discussed in the forgoing includes at least one of the kiosks described herein. An exemplary kiosk is shown in the attached FIG. 9. The kiosk 500 includes a main body or housing 502. The housing 502 includes a plurality of stereo cameras (or depth sensing cameras) 504 all connected by and to a computer or other processor. The kiosk 500 further includes a light ring 508 or other similar flash device enabling the system to more easily define and view the contents A, B within the basket portion 512 of the cart 510. The kiosk 500 further includes a wireless scale 506 for weighing produce or other bulk foods.

Each kiosk 500 will contain cameras, and a master computer that communicates with the app via wife, cellular and/or Bluetooth®. The cameras will be programmed to know every item within the store in detail. This detail includes: SKU, Item Name, HSV, RGB, and its 3D Dimensions. The cameras 504 will be using a series of advanced algorithms to properly detect and recognize the items in a shopper's cart, bag, or while transferring from cart to bag. The cameras 504 and camera system will communicate with the application to determine the validity of the shopper's items.

By way of example, the user has two items on his or her list: bananas, and apples. If the camera system detects a box of cereal in the cart 510, the system will automatically notify the shopper and allow the shopper to remove the product from the shopper's cart or add the item to the shopper's shopping list, so the total shopping price can be adjusted. If the user ignores the error, the kiosk 500 will illuminate its light to warn employees of the store that there is an item detection error.

The camera uses a series of advanced algorithms that communicates with the user's grocery list within the mobile application. The first operation the cameras uses is robotic vision through python and opencv. This allows the camera to track objects based on their HSV, RGB, and dimensions. The camera system will be using multiple object tracking algorithms. One algorithm is in real-time and is used in connection with high quality product detection and product isolation known as KCF (Kernelized Correlation Filter). Another algorithm is TLD (Tracking, Learning, and Detection) used to search for specific items that correlate with the list only.

These algorithms and methods of detection are used in connection with the cameras and may be used independently or together as the system requires and permits.

The KCF algorithm is programmed to find all items in the store and catalog the ones it detects when a new user approaches. The items it catalogs should be an exact match to the user's shopping list that is activated. The KCF system will send a warning/notification if items that are not on the list are discovered.

The TLD algorithm is programmed to find items that are only on the user's grocery list. The TLD system will send a warning/notification if list items are missing in the cart. This system offers real-time grocery product detection, and deep learning to prevent store theft, and product hiding within a bag or cart.

In some embodiments, the system as described herein utilizes machine learning to eliminate item theft and accidental over charges to the customer. FIGS. 10-13 illustrate and describe the present system utilized to improve performance of the system by utilizing machine learning. The system discussed and shown herein creates a seamless checkout process.

In some embodiments, the validation and detection process used for confirming the identity of an item involves the use of machine learning models, including but not limited to, image classifiers and object detectors, and pixelbuffer comparisons. A machine learning model like an image classifier or object detector takes an input image and runs an algorithm to determine how likely the image or objects within the image matches a trained item within the model. The model then outputs an identifier and a confidence score or multiples of each. For an output to be considered reliable the confidence score needs to reach a desired threshold. It is important to note that while the model is running it will constantly output identifiers and confidence scores at a rate of several times each second, even if a trained item is not present in the image frame. A well trained model however will never assign high confidence scores to an image that does not contain a trained item. Setting a high confidence threshold therefore ensures a high accuracy.

A second aspect of the aforementioned validation method involves pixelbuffer comparison. Individual images, frames, or the machine learning model outputs from given images can be held for further future use, these images are defined as buffers. As the model is running, previous model outputs that have reached the confidence threshold are placed into a buffer and/or moved through a sequence of buffers. Holding outputs within these buffers allows for the comparison of current and previous model outputs. This comparison of outputs is beneficial since it include providing parameters for certain actions and further strengthening the accuracy of the outputs.

By way of example, the system begins with no trained items within the camera frame with the machine learning model attempting to determine if there are any trained items in the images. With no trained items in frame, the model outputs the identifiers for the most likely item or closest match with an associated confidence score. The model in this case is well trained and assigns only low confidence scores to these outputs which fail to meet the confidence threshold to be considered reliable. A trained item then enters the camera view. The model, based on its training and algorithm, begins recognizing the trained item and outputs a higher confidence score to the appropriate identifier. The confidence score reaches or exceeds the required confidence threshold for the program to take further action. This output is then placed into a buffer. The model then outputs again with a high confidence score for the same item. Remember, the model is creating several outputs a second meaning a single item will likely remain in the frame for the model to recognize it several times. Upon creating a subsequent model output which meets the required confidence threshold, the new output is then compared to the result of the previous output and certain parameters are consulted for actions. In this case, if the previous output identifier is the same as the new output identifier the system may consider both outputs to be a result of the same item still within the camera frame. In another case, the identifier of the new output is different from that of a previous output and so informs the system that a new item has entered the camera frame.

The present checkout system and item authentication process shown and described here relies on machine learning. Machine learning finds algorithms that collect data on items which give the system insight and the capability of predicting or recalling an item or object based on the data collected. The more the system runs, the more data it collects, the more questions it generates, and therefore higher prediction/precision rates appear. In other words, the system continues to collect images and other data to continuously improve the accuracy of the system and the detection of products.

The present system uses machine learning whereby a catalog is created to catalog items in the store. The system is a completely functioning item detection system for the grocery industry that performs with a 100% precision and 100% recall rate. Using high quality 360° photos of items, the camera system is fully aware of the items users take from shelves as well as the items in a shopper's cart.

This item authentication system connects directly to the application, system and software such as described herein. The kiosk (also known as a pace station) as described and shown herein has a camera built in. The system can also utilize the cameras already mounted in the store facilities to further provide accuracy to the overall system and to provide additional angles in photo taking.

The kiosks will use the machine leaning so there is no need to manually input item color identification in the system's data. Traditional methods commonly utilize just color for item authentication. The present system utilizes actual photos thereby improving accuracy of the item authentication. The machine leaning system studies and learns every detail of each item. Accordingly, a high level of item authentication accuracy is thereby achieved.

Figure 10:
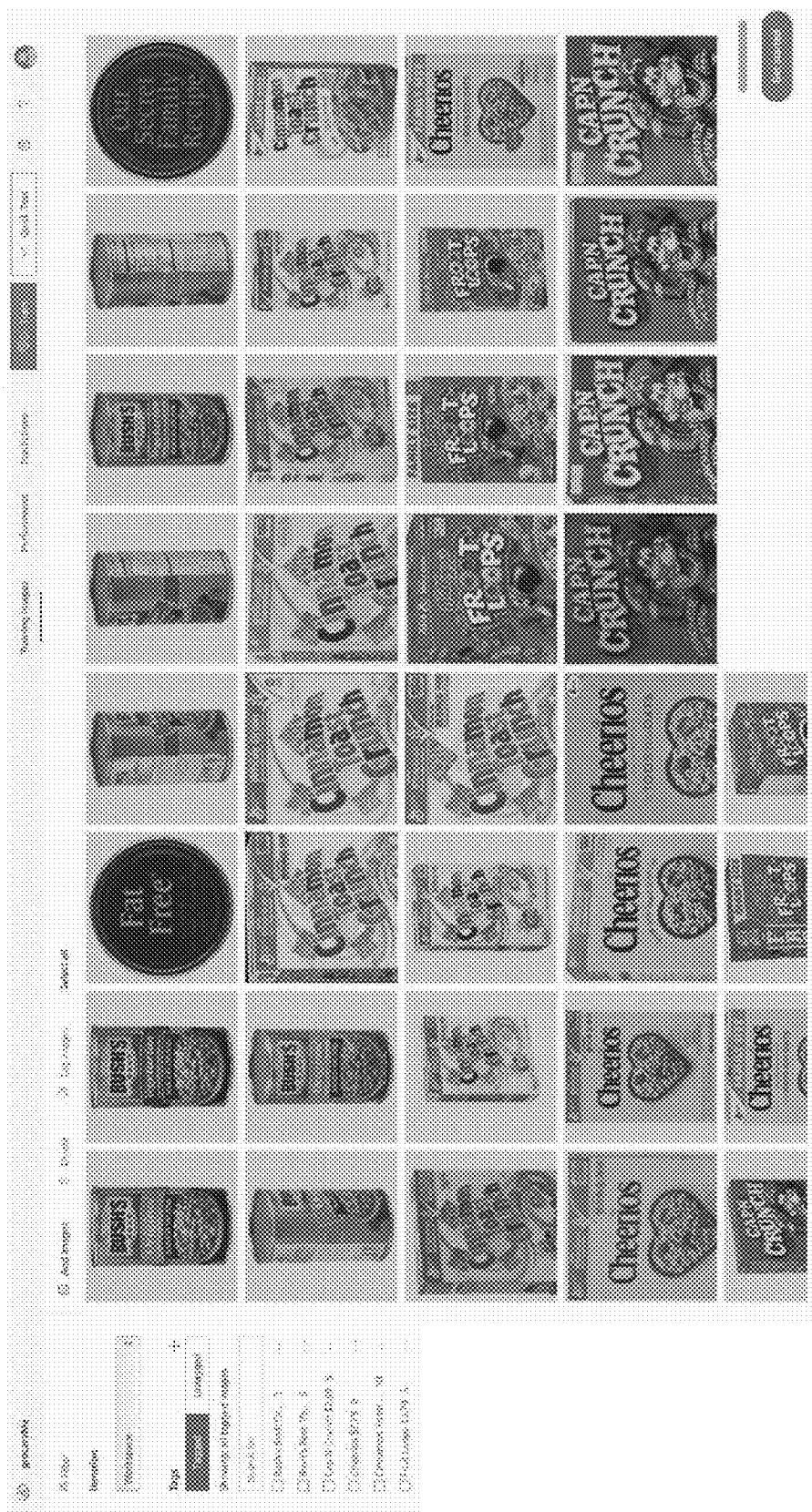
FIG. 10 depicts an exemplary embodiment of a store item catalog according to one or more embodiments shown and described herein.
Figure 11:
FIG. 11 depicts an exemplary performance chart based on the catalog of images as illustrated in FIG. 10 according to one or more embodiments shown and described herein.

FIG. 10 depicts an exemplary embodiment of a store item catalog according to one or more embodiments shown and described herein. In this embodiment, fewer images (typically 5-6) of each item are cataloged, as illustrated by FIG. 10. By way of example, and in reviewing FIG. 11, there are 5 images of Fruit Loops® cataloged. FIG. 11 depicts an exemplary performance chart based on the catalog of images as illustrated in FIG. 10 according to one or more embodiments shown and described herein. Based on this performance chart and in this Fruit Loops example, 88.9% precision is reached with 100% recall. However, as shown in the Cinnamon Toast Crunch® example, 100% precision and recall are reached with 10 images cataloged. In full function and after time, hundreds of photos will be cataloged eliminating error. The more the system is used, the better it will perform.

Figure 12:
FIG. 12 depicts an exemplary improved store item catalog according to one or more embodiments shown and described herein.
Figures 13, 14:
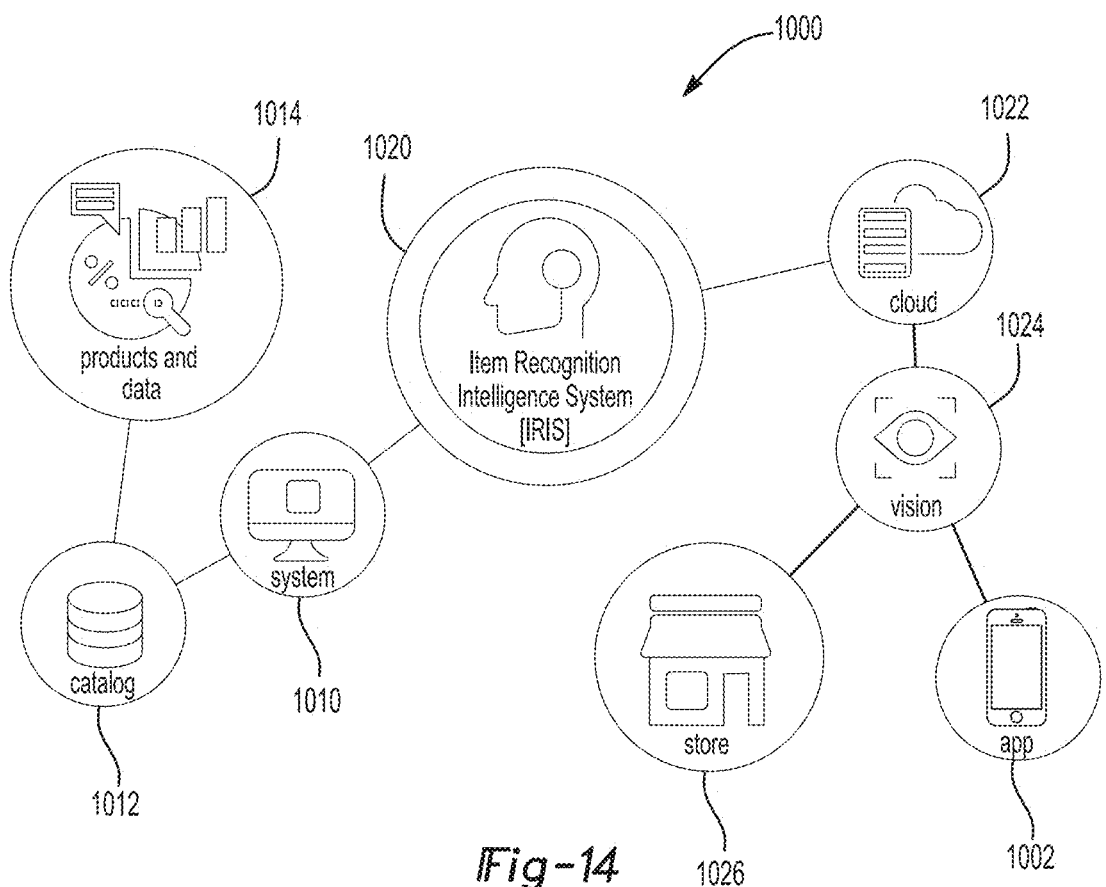
FIG. 13 depicts an exemplary performance chart based on the improved catalog of images as illustrated in FIG. 13 according to one or more embodiments shown and described herein.
FIG. 14 depicts a flowchart depicting the Item Recognition Intelligence System ("IRIS") to one or more embodiments shown and described herein.

FIG. 12 depicts an exemplary improved store item catalog according to one or more embodiments shown and described herein where a higher number of images are used. As shown, in these embodiments, 15 images are cataloged. 100% accuracy is achieved by having high quality images and data; without high quality data the accuracy cannot be perfect. Quantity is not a guarantee for higher precision. Photos that can be detailed in different lighting and camera angles is the key to success. FIG. 13 depicts an exemplary performance chart based on the improved catalog of images as illustrated in FIG. 12 according to one or more embodiments shown and described herein. As shown by this chart, when 15 (or more) images are used, 100% precision is achieved, in some embodiments.

Figure 15:
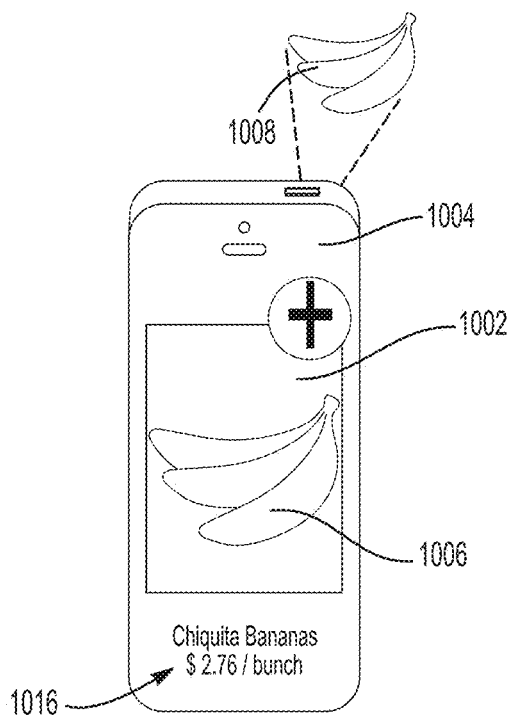
FIG. 15 depicts an exemplary screenshot of the AI feature where the camera is pointing at an item according to one or more embodiments shown and described herein.

FIGS. 14 and 15 provide for an artificial intelligence feature contained within the application improving function for the user. The artificial intelligence feature within the application, as illustrated in FIG. 14 is in communication with the camera on a user's mobile device. When the system is permitted access to a mobile device camera, the system processes live camera imagery and recognizes the item that the user is pointing at in detail. The system then allows the user to interact with the recognized item within the application. The type of interaction permitted includes tapping, voice recognition, voice activation, clicking, and/or gestures.

Figure 16:
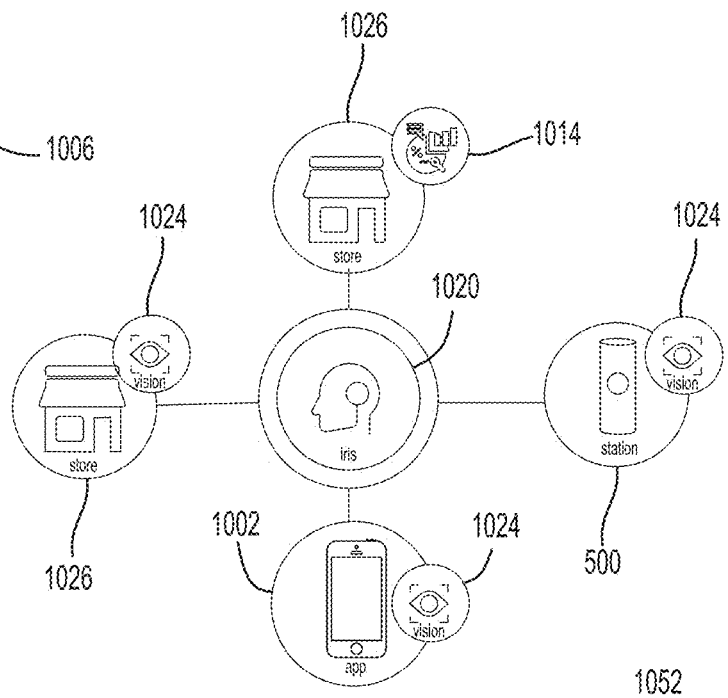
FIG. 16 is an exemplary model of IRIS in use according to one or more embodiments shown and described herein.

The above described system and corresponding function within the system and as illustrated in FIGS. 14-16 reference specific items that have been trained and programmed within store specific item catalogs, and/or store specific models. The system 1000 as described herein and as shown in FIGS. 14-16 promotes higher efficiency as well as faster reaction time. Because of the store specific catalogs, faster reaction time and efficiency may be provided for.

By way of example, if a user wants to add an item to their grocery list, they start the process by accessing the application 1002 on their mobile device 1004. The user selects the program and opens the system in the live view screen 1006. When the user points at a physical and tangible product 1008, for example Cheerios®, the system 1010 will recognize what the item is in detail. This information is pulled from the store specific catalog 1012 of products (based on the information contained in the database) and data 1014. The system then processes that information and makes it accessible for the user within the application. According, there is no requirement for a barcode. The system processes and gathers information, and displays product information 1016 to the user without requiring any barcode, but rather relying entirely on image data and product database photographic information.

Similarly, such as illustrated in FIG. 15, Chiquita® bananas are pictured. The user selects the program and opens the system in the live view screen 1002. When the user points at a live product, for example Chiquita® bananas, the system will recognize what the item is in detail 1016 and identify automatically that the item is specifically Chiquita® bananas. This information is pulled from the store specific catalog of products 1008 (based on the information contained in the database). The system then processes that information and makes it accessible for the user active within the application. Again, no requirement for a barcode and enabled user interaction.

This Item Recognition Intelligence System (also referred to as IRIS or iris) 1020 is in communication with both the system 1010 and the cloud 1022. The cloud 1022 is configured to store and collect additional data using a camera or other vision 1024 from both the store 1026 and the user's mobile device and application 1002. This collection of information, data and images is collected by IRIS 1020 and the system 1010 for implementation into the catalog 1012 including the products and data 1014. This collection of data by machine learning exponentially increases the accuracy of the overall IRIS system by collecting mass quantities of information, data and images for comparison to live products, such as shown in FIG. 15.

FIG. 16 depicts the multiple sources of collection of data by the iris system 1020. The iris system 1020 collects data from the store 1026 using its data 1014 already in the store 1026 database. This information includes SKU information, images, price information, color images, product data, and any other applicable information necessary for the operation of iris 1020.

The system 1020 is further in communication with the kiosk 500 which includes vision for a camera 1024. The camera 1024 of the kiosk 500 collects information as users check out. This information is transferred back to iris 1020 and is stored. All information is stored in a hard drive 1052, such as illustrated in FIG. 17.

The system 1020 is further in communication with the user's device and mobile application 1002. A mobile device includes vision such as a camera 1024. As a user collects information and data, it is transferred back to the system 1020 and subsequently stored.

The system 1020 is also in communication with the store 1026 that collects data using the camera systems 1024. The star camera system using the camera 1024 collects images when the system is in use such as when determining if a user removes an item off of a shelf or other display within a store. These images collected during the termination of item removal by a user is collected by the camera 1024 and communicated to the system 1020 and subsequently stored.

Figure 17:
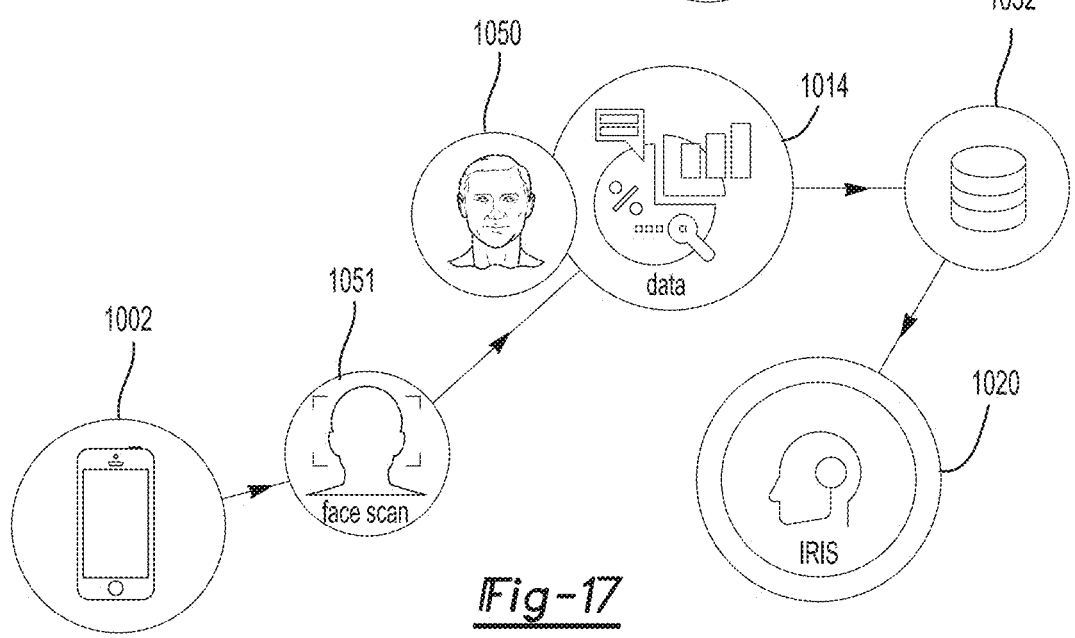
FIG. 17 is a flow chart/diagram of the overall system according to one or more embodiments shown and described herein.

FIG. 17 discloses and depicts the overall and general operation of the iris system 1020. The system 1020 is in communication with data storage 1052. Data in the data storage 1052 is collected by means as discussed above. The data 1014 may be collected by a user 1050. Further, to use the system, the user 1050 takes a face scan 1051 to confirm the identity of the user 1050. This scan is required to operate the mobile application and automated checkout and list creation in the aforementioned and the foregoing. In some embodiments, the face scan 1051 is done using the mobile app 1002.

Figure 18:
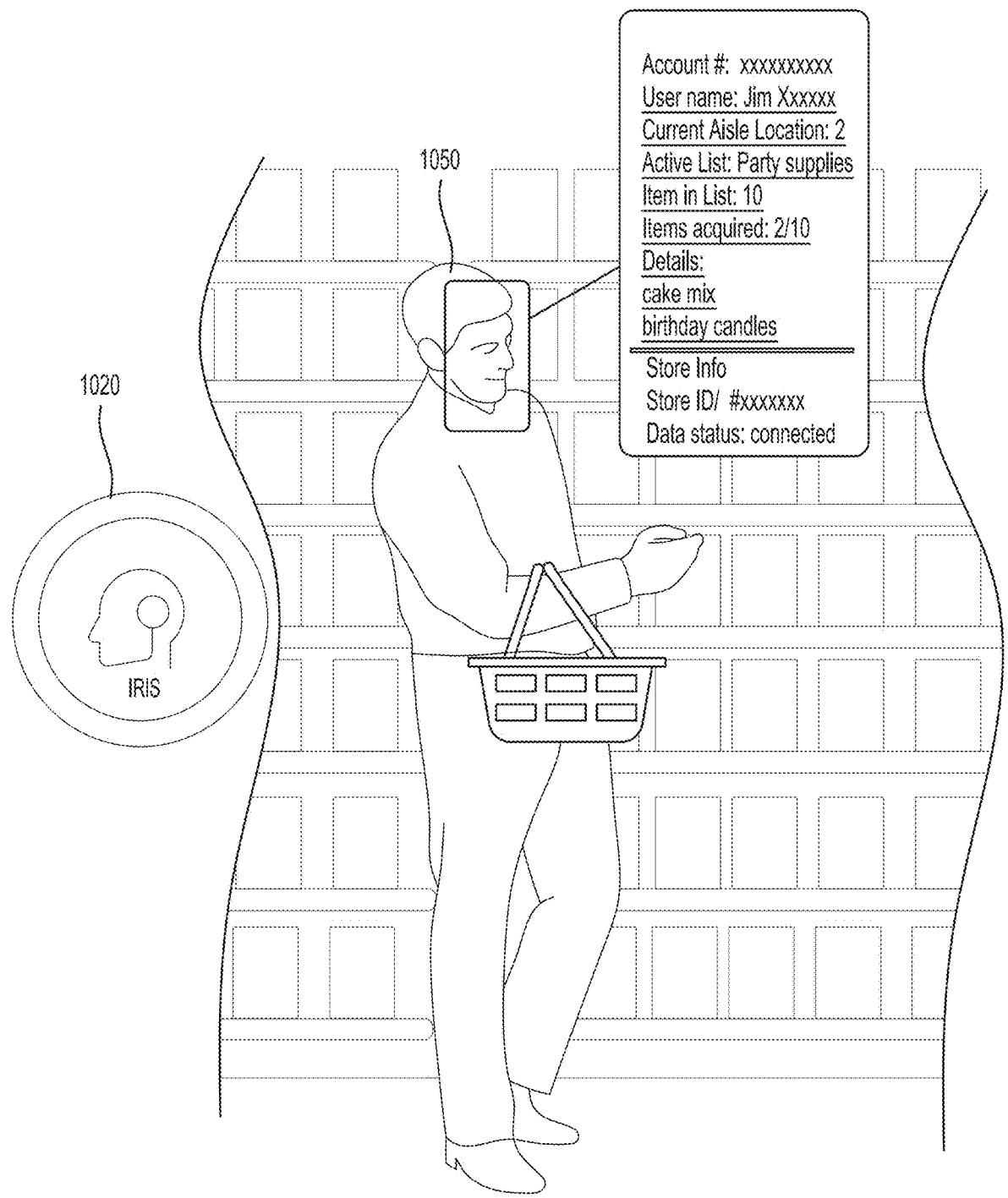
FIG. 18 is a schematic view of the system as broadly disclosed herein according to one or more embodiments shown and described herein.
Figure 19:
FIG. 19 is an exemplary photographic and graphical representation of the system illustrating the location of a product as viewed through the mobile application highlighting the product location to enable easy location of the product by the user according to one or more embodiments shown and described herein.

FIG. 18 depicts a schematic view of a user 1050 shopping in a store using the present system and iris 1020. In this view, the user 1050 has checked into his account using a face scan and the system is connected to the user's shopping list. In this embodiment, the user includes 10 items on his list including but not limited to cake mix and birthday candles. In this embodiment, the user is being directed through the store by means of the aisle priority system so as to easily find said cake mix and birthday candles. Furthermore, the user in the present embodiment is utilizing iris or the present system 1020 so that items are easily recognized when the user remove them from the shelf or display.

In some embodiments, and as illustrated in FIG. 26, an additional masking process may be taken that improves visual detection. At the kiosk or other checkout area, a system is provided using depth sensing hardware and cameras and software. The system uses a biometric focused mask that creates a clear focal point for machine learning framework to retrieve data from (as illustrated in the side-by-side comparison as shown in FIG. 26). This allows high traffic areas to remain highly accurate because of a generated mask around the desired active shopper, thereby only focusing on the desired active shopper. The system searches for an assigned focus point within a given frame/image. In some embodiments, the focus point is a user's face. The system then retrieves depth data from the corresponding area in the image where the user's face is located. Using this depth data the system is able to determine what areas make up the background of the image or the portions which are not meant to be considered for classification. Once the background has been calculated, the system places the binary mask over the background area of the image (depicted on the right of FIG. 26). After the masking has been applied, a machine learning model is applied to process the image. The benefit of applying this binary mask and then processing the image is that this method effectively removes any background "noise" which could interfere with obtaining accurate outputs from the machine learning model.

Figure 27:
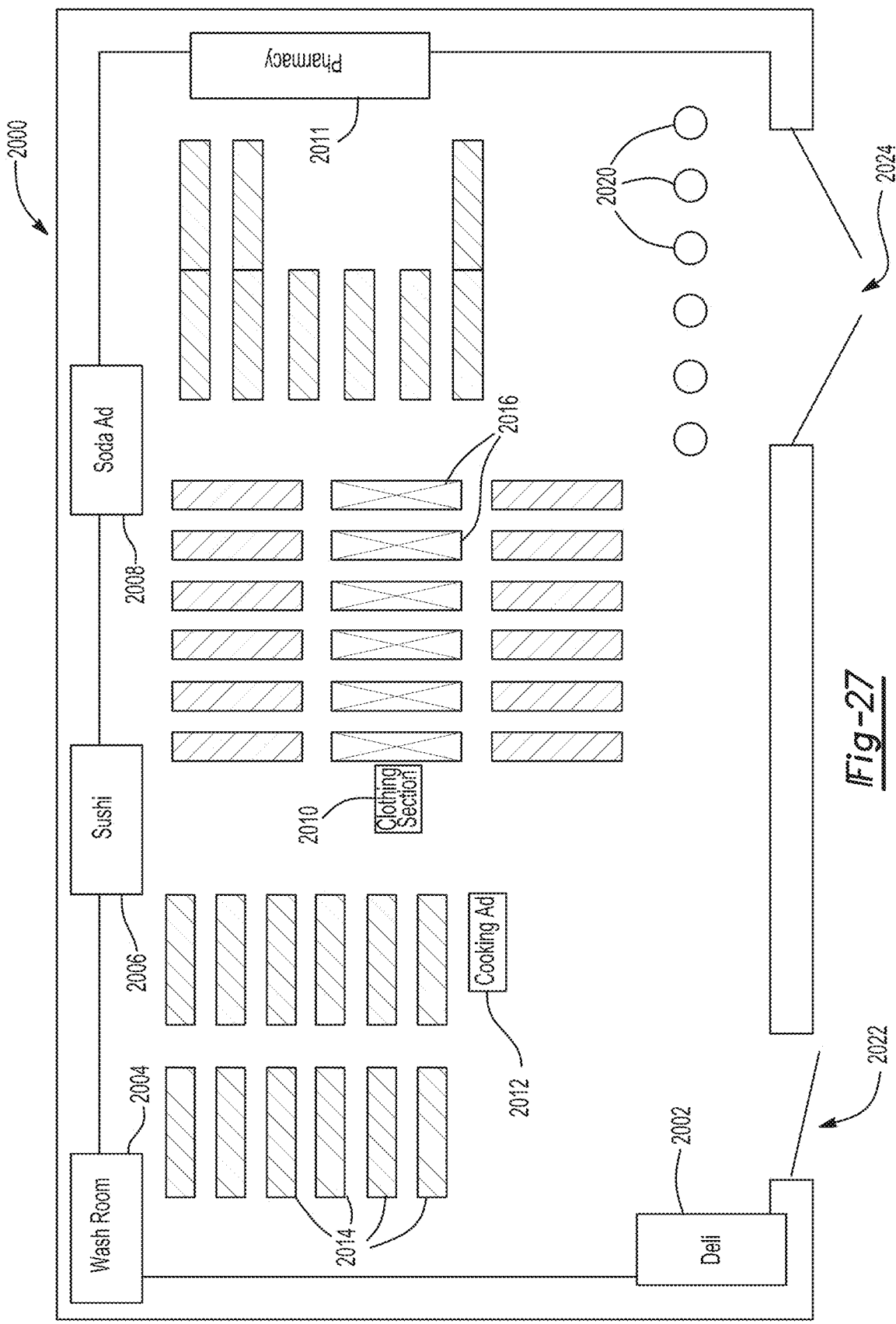
FIG. 27 depicts a schematic representation of the landmark navigation system graphically displayed according to one or more embodiments shown and described herein.
Figure 28:
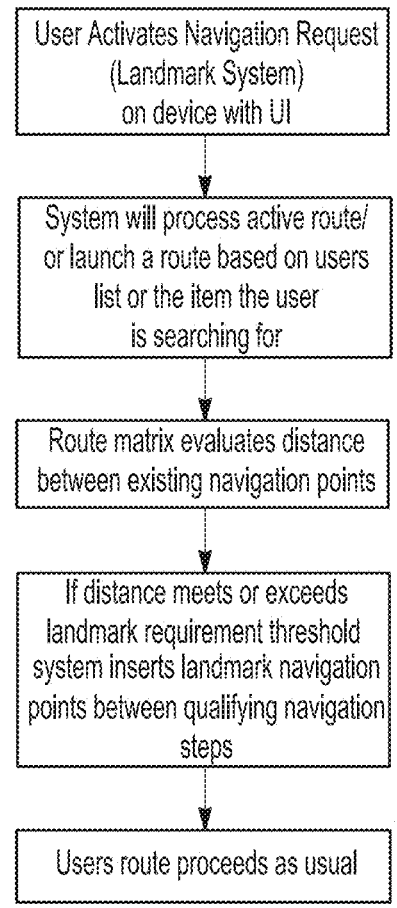
FIG. 28 depicts a flow chart embodying the landmark navigation system according to one or more embodiments shown and described herein.

In another aspect of the present specification, a landmark navigation system is provided to help users easily locate a product based on known landmarks within a store, such as the sushi stand or a cookie advertisement. Figures relating to the landmark navigation system are shown in FIGS. 27 and 28. The landmark navigation system is designed to navigate users by using the retail space's points of interest, landmarks, marketing stands, departments, or other distinguishable or notable features within the space to aid in the users navigation through the store. This system is intended as a supplement to the primary SKU based navigation system, not a replacement. This system could be particularly useful for users in larger stores in cases where desired items are located far apart from each other. These landmarks are implemented as navigation points along the user's route to aid in progressing the user through the route without becoming disoriented or lost.

By way of example, and with reference made to FIG. 27, a store layout with various areas are shown. The store 2000 includes a deli 2002, a wash room 2004, a sushi stand 2006, a soda ad 2008, a pharmacy 2011 and an entrance/exit 2022 and 2024. A plurality of checkout kiosks 2020 are also provided. A cookie ad 2012 and a clothing section 2010 are provided adjacent the aisles 2014 and 2016. When progressing through a route rather than simply receiving the instruction to "proceed to aisle 12" with the landmark system active the navigation might include "proceed past the pharmacy, a soda advertisement, and then to aisle 12". In this case the pharmacy and soda ads are included as landmarks or navigation points to aid the user in reaching their destination, aisle 12. Though a user may have been able to navigate to their destination without the inclusion of the landmark, some may certainly find it as a desirable aid.

The landmark navigation system as disclosed above operates as shown in FIG. 28. As a first step, the user activates the landmark navigation request (landmark system) on a device with the user interface. The system then processes the active route or will launch a route based on the user's list or the item the user is searching for. The route matrix evaluates the distance between the existing navigation points. If said distance meets or exceeds the landmark requirement threshold, the system then inserts landmark navigation points between qualifying navigation steps. The route then proceeds as normal.

Figure 20:
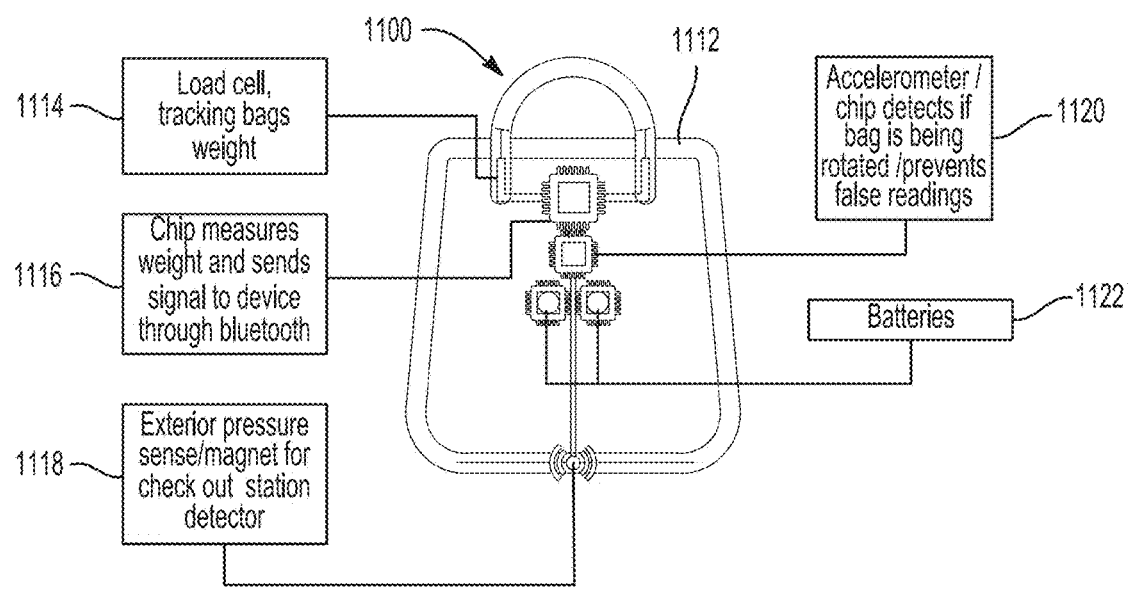
FIG. 20 is an exemplary diagram of the gravity bag having a weight measuring device, accelerometer, pressure sensor, Bluetooth® . . . etc. according to one or more embodiments shown and described herein.
Figure 21:
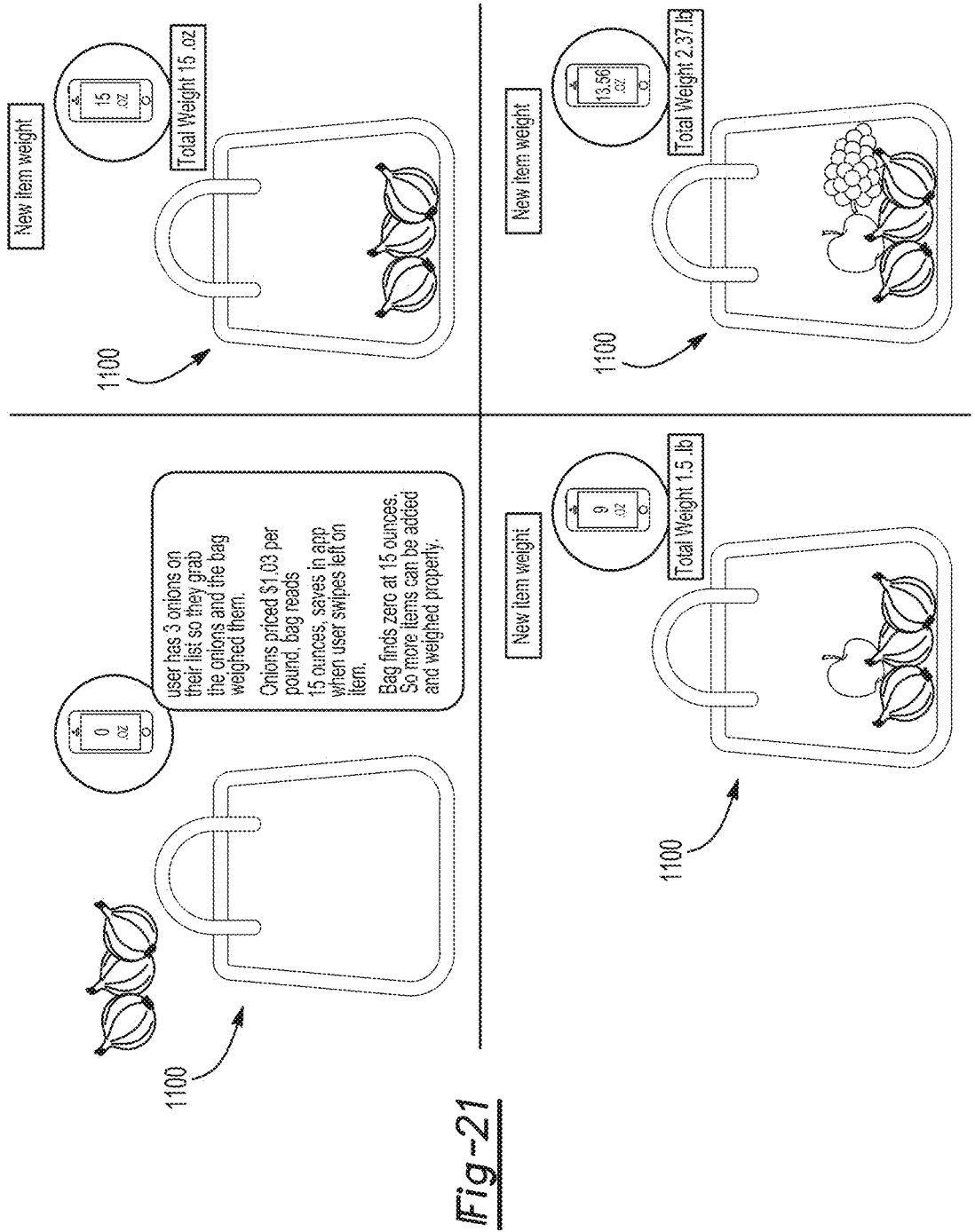
FIG. 21 depicts an illustrative embodiment of the gravity bag in use according to one or more embodiments shown and described herein.

FIGS. 20-21 illustrate a gravity bag 1100 of the present specification. The gravity bag is the solution for variable cost items (e.g. produce measured by weight to determine cost). The gravity bag 1100 as shown herein connects to the present system and allows users to weigh produce (or other variable weight items) and leave said items in the bag and continue to weigh new items. After the user is finished weighing the current items in the bag, the bag processes and it zeroes out so that the user can continue to use the bag with the prior items in the bag.

The gravity bag 1100, as illustrated in FIG. 20, includes a bag portion 1112 being a standard bag made out of polyester, cotton, nylon etc. or any other suitable material for a bag configured to hold variable weight items. The bag further includes a load cell 1114 which tracks the bag's weight as the user adds items to the bag. The gravity bag 1100 further includes a chip 1116 which measures the weight and sends a signal to the device through Bluetooth®. This signal (or other similar wireless signals), in the present embodiment, is sent to the user's mobile device through the mobile application. Information is sent to the mobile application regarding the weight of the present item most recently added to the gravity bag 1100. The gravity bag 1100 further includes an exterior pressure sensor 1118. The pressure sensor 1118 may also be a magnet used for check out station detection. An accelerometer 1120 is used if the bag is being rotated, twisted, and or spun to prevent false readings. Furthermore, battery 1122 (or multiple batteries) is (or are) used to power the various components discussed herein to operate the gravity bag 1100.

By way of example, the user has three onions on their list. The user grabs the onions and the bag weighs said onions. The onion price is $1.03 per pound. The gravity bag reads 15 ounces in onions and then saves the data in the mobile application (after the user indicates to the application that the weighing is done). The bag then finds zero at 15 ounces. This process repeats so more weight based items can be added, weighed, and priced properly. The structure of the bag is illustrated in FIGS. 22-24.

Figure 22:
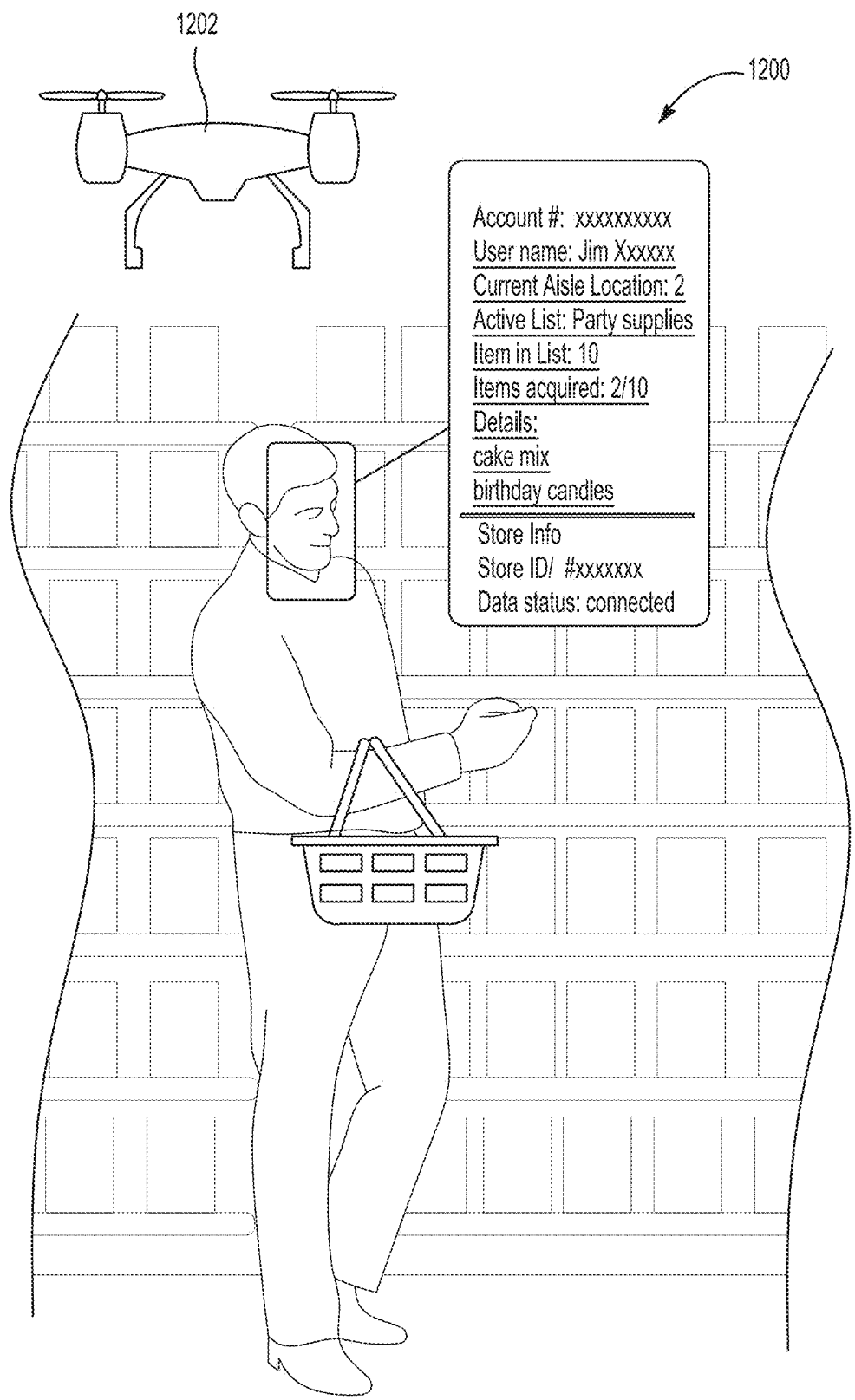
FIG. 22 is a broad depiction of the drone shopping assistant according to one or more embodiments shown and described herein.
Figure 23:
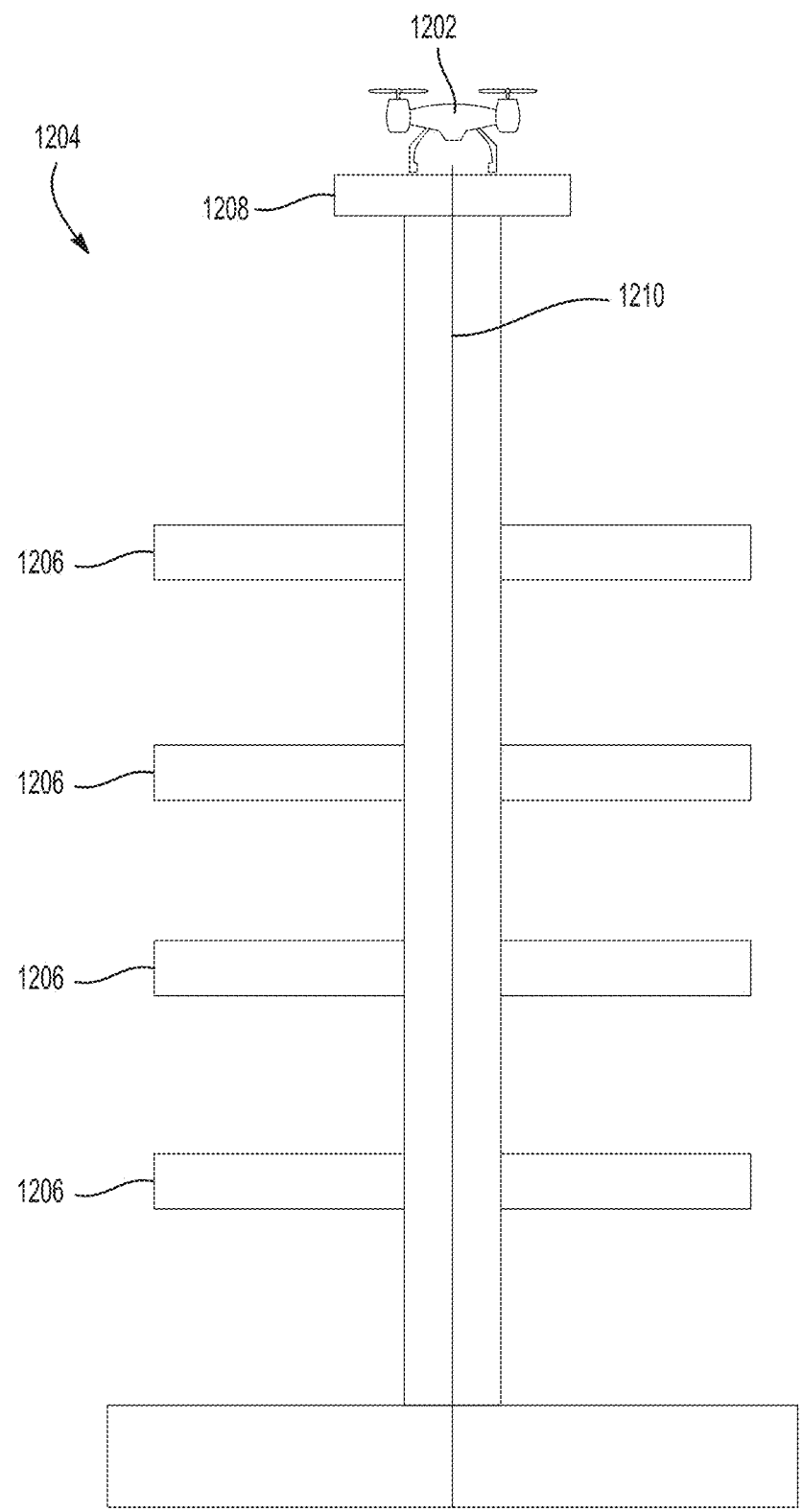
FIG. 23 depicts an exemplary model of the drone charging shelving from a side view according to one or more embodiments shown and described herein.
Figure 24:
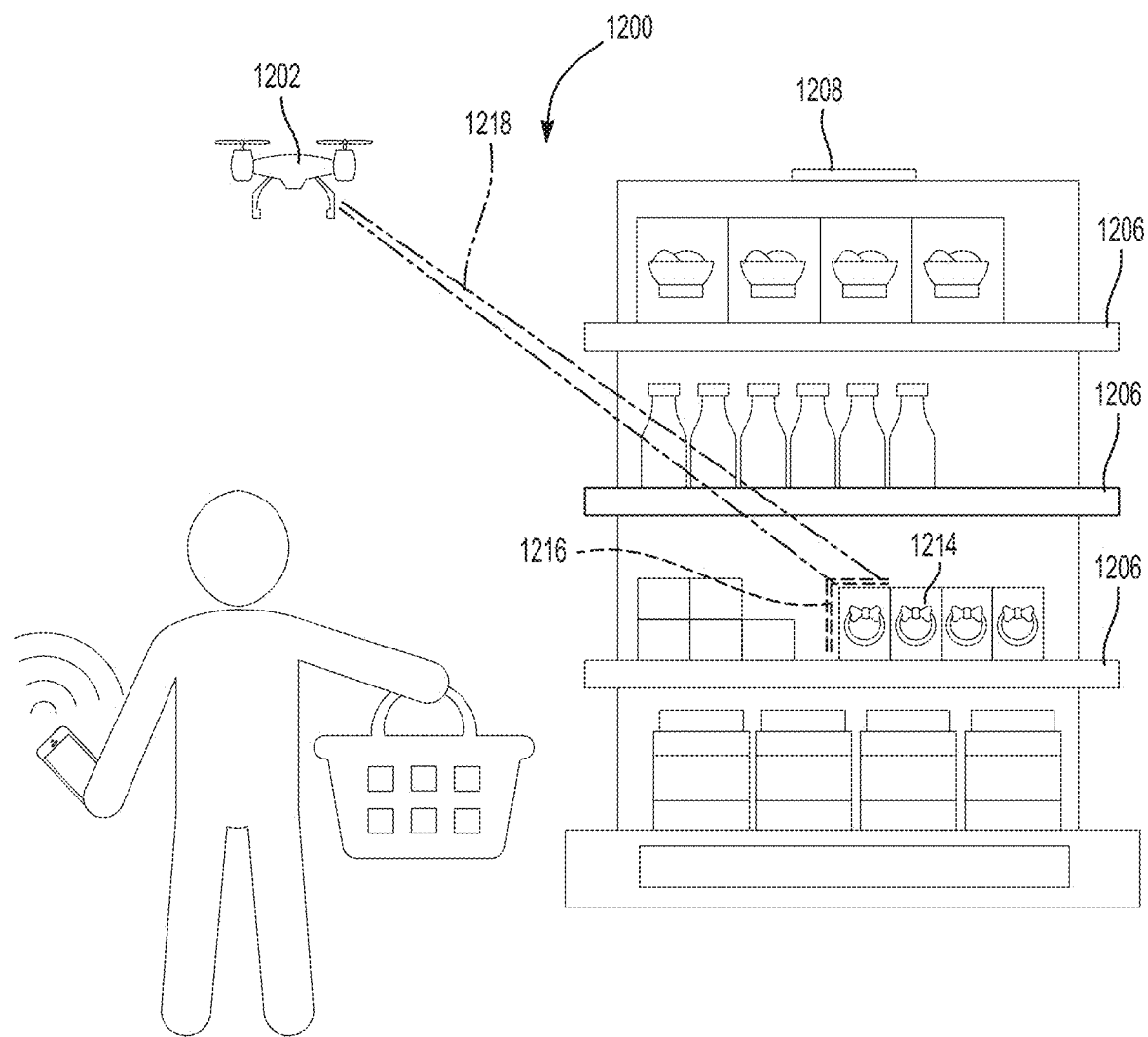
FIG. 24 depicts an overall exemplary diagram of a user using the drone assistance system wherein the drone moves from the drone charging station, along a flight path to the users location so as to illuminate a specific product that the user has requested assistance in locating wherein the illumination is a light projection from the drone to a specific product according to one or more embodiments shown and described herein.
Figure 25:
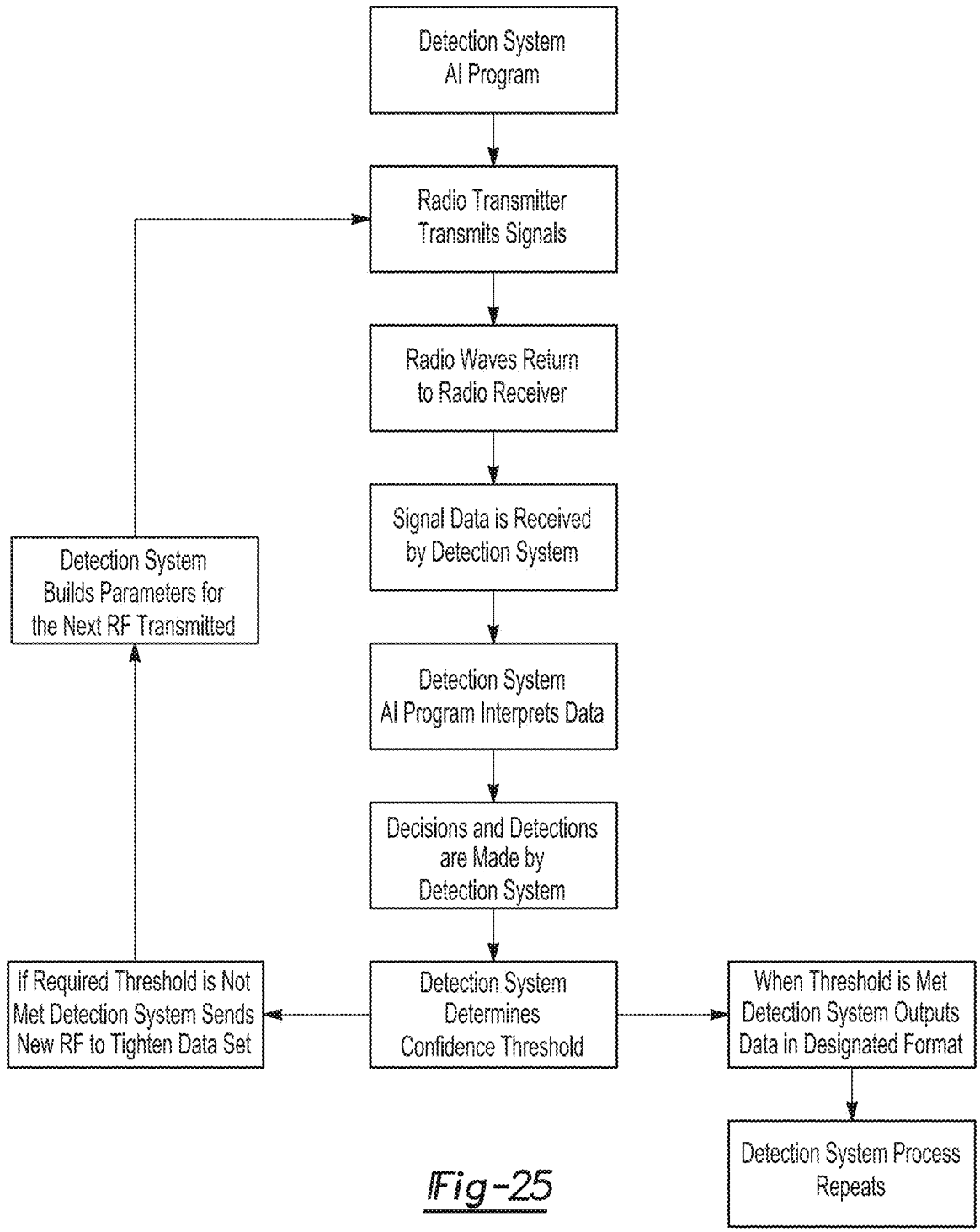
FIG. 25 depicts a flow chart depicting the process of the radio transmitter detection system according to one or more embodiments shown and described herein.

FIGS. 22-24 are directed to the drone assistance system of the present specification. The drone system 1200 of the present specification is configured to work directly with the mobile application as herein described. In this embodiment, a drone 1202 is a nano drone and configured to charge wirelessly on a charging pad 1208 on top of a shelving unit 1204 having a plurality of shelves 1206. A wire 1210 connects the wireless charging pad 1208 to a power source. In some embodiments, the charging pad 1208 is positioned on top of the aisle shelves. This placement allows the drone 1202 to charge in the exact area where the shoppers are so that if a shopper is in an aisle for an extended period of time, that user's dedicated drone may land and receive a quick charge before continuing with its paired user.

Upon activation from user request for drone guidance the user device will send a navigation ping to signal the user location to the dispatched drone. The activated drone will then pair with the user through connecting to the user's device, facial recognition of the user, or a combination of the two. The drone 1202 utilizes a live video feed from an onboard camera to detect, recognize, and track users.

In some embodiments, the drones are equipped with light projection 1218 capable of depicting images, colors, or outlines onto surfaces spaced apart from the drone, such as shown at reference numeral 1216. In the embodiment as illustrated in FIG. 24, the drone projects a light onto a single product 1214 on a shelf 1206 within an aisle. Upon the request of a user through the mobile application, the drone locates the product that the user is unable to locate and highlights with a light projection the specific item that the user is looking for.

Pairing the drone assistance system drone onboard camera with computer vision software allows the drone to perform object detection and recognition, and facial recognition. These capabilities combined with AI programming enable the drone to guide a user to a requested item and indicate the item's precise location to the user (such as the aforementioned item highlighting). The AI programming provides the functionality of the drone charging procedure through recognition of low power levels and subsequently directing the drone to return to a charging pad and assigning a replacement drone to continue user service.

It should also be noted that the present system and method is intended for use on a user's mobile device, such as a cell phone. In the present specification, the system is intended to be used in both the user's home and in the store thereby preventing incorporation of a kiosk system or personal device system whereby the store owns said personal device.

Another element to the present system is an object detection system, branded as AURA™, that makes use of wireless radio frequencies to determine items not visible by traditional cameras. The present system includes use of wireless radio frequencies or Wi-Fi to determine items not visible by traditional cameras or other detection means. Using a radio transmitter, a series of signals are sent that project onto the desired objects or area (such as in a store or a warehouse). These signals travel through solid surfaces and when they interact with surfaces or objects they create a return signal that is received by the radio receiver (essentially microradar). For example, these signals are sent though shelving units to determine if there are additional items behind those items visible by a camera. These signals are categorized and translated into usable data that describes the object in detail. Using the cameras in proper context within this system, the system will detect if there are more items behind an object that is visible to the cameras. These signals will give the measurements and potential mass of the object with rebounded signals therefrom. These signals will provide the present system with the capability of giving an accurate location and triangulation of the item detected.

The object detection system uses an artificial intelligence ("AI") program. The AI program is in communication with a radio transmitter. The radio transmitter transmits signals in a space, such as a warehouse. Signals are configured to pass through solid objects, such as vertical services on shelves. Radio waves return it to the radio receiver. The radio receiver includes a processor configured to determine if an object is located behind solid surfaces, such as a vertical surface on a shelf or behind existing products on a shelf. Signal data is received by the detection system and the AI program interprets the data to determine if an object is present. Decisions and detections are made by the detection system. The system then determines a confidence threshold and when the threshold is met, the detection outputs data in the designated format, such as graphically, pictorially or by some other signal, such as an audible signal. The detection system then repeats the same process. If the required threshold is not met, the detection system then it sends a new RF to strengthen the data set and determine if an object is present. The detection system then builds parameters for the next RF transmitted and the radio transmitter transmits the signals. The process then continues on as with the prior transmission and receipt of signals.

This system is also in communication with the aforementioned existing consumer technology and is capable of detecting a customer location and triangulation in real-time.

By way of example, a signal transmitter, upon setup, begins sending signals throughout the room or designated area (such as a shopping area or warehouse). As the signal travels and comes into contact with objects, the signal will continue to travel through the object while also creating a bounce back signal called a return signal which travels to a receiver. The speed and number of return signals informs the aforementioned system about several metrics including the dimensions of an object, relative location, and number of objects. When pairing this data with camera imaging, the system is capable of detecting objects that are invisible (i.e. hidden behind products visible to traditional cameras) to the camera's detection.

It should be noted that all of the aforementioned systems can be applied to any area where it is desired to locate, track, visualize, account for, image, detect, and/or inspect any items within a store, warehouse, production facility . . . etc. Any of the above mentioned artificial intelligence, camera, radio frequency . . . etc. systems can be used to locate, track, visualize, account for, image, detect, and/or inspect any items within a store, warehouse, production facility . . . etc.

In another aspect of the present specification, Wi-Fi is used to detect biomagnetism, bodily frequencies, bodily wavelengths and the like. The present system relies on micro radar. Using a radio transmitter, a series of signals are sent that project onto desired objects or areas (such as described above). These signals travel through solid surfaces and when they interact with surfaces or objects they create a return signal that is received by the radio receiver. This current aspect of the specification is focused on biomagnetism radio frequencies and Electroencephalography to set parameters for body function as well as neuro commands without wearable technology. The present system is tethered to the user's person and isolates the user's designated signal (AURA™) solely to that user's body area using AI commands and Wi-Fi signals.

The present system performs similar to the way human eyes function and interpretation of light in the ganglia cells within the eye react to light frequencies and amplitude. The Wi-Fi signals interpret the frequency of a wave to associate it with a specific being state (emotion, illness, disease or other physical state). The frequency of a wave of light determines the hue, and amplitude of the frequency determines the brightness. The eye reacts in correspondence to light waves because the pupil serves as a window to the ganglia cells, and many other elements.

The present system is designed using radio frequencies to monitor and communicate with ganglia cells. The present system serves as a window into these cells. Ganglia work as a relay station for nerve signals as a connection point: plexus start and end with ganglia cells. Ganglion serve as response points in the nervous system, that is why they are the first neurons in the retina that respond with action potentials to use the present method and system in connection therewith.

The present system further uses Wi-Fi as a means of electromagnetic frequencies to communicate with ganglion cells and plexus within the human body. Using Wi-Fi, the present system detects brain wavelengths for functions autonomous and motor skill related, such as gross body movement and fine body movement. The present system serves as a bridge for the nervous system relaying brain commands to ganglia that are disconnected due to spinal cord injuries, nervous system disorders, or diseases.

Using AI, the present system takes a language the body understands and programs it within Wi-Fi signals to allow a seamless flow of communication between brain and nervous system relays. This allows spinal cord injuries, and other nervous system issues somatic and autonomic, to be fixed without surgical implants or wearable devices using programmed Wi-Fi (AURA™) as a means of connection with the body and computer.

Figure 29:
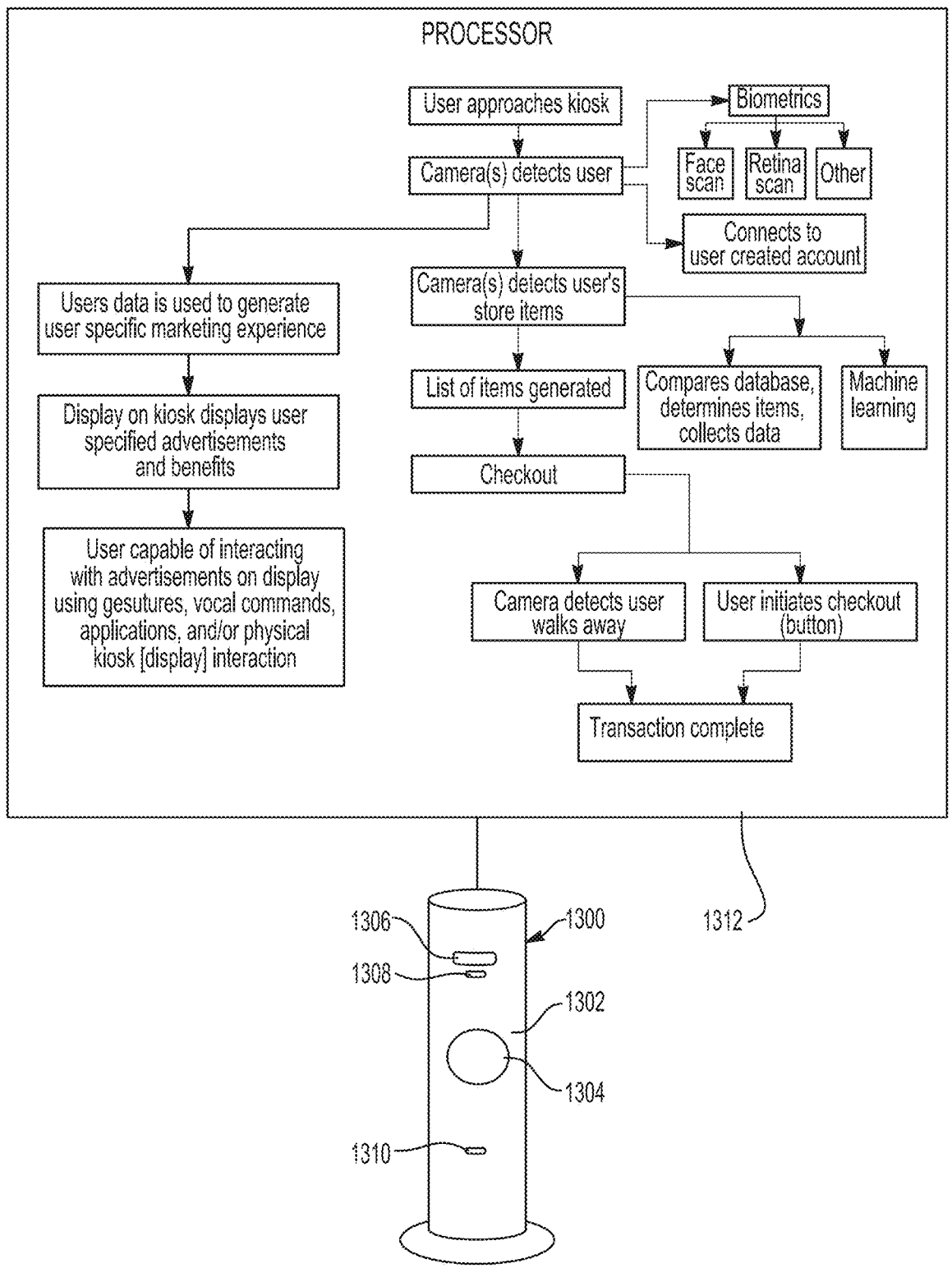
FIG. 29 depicts a kiosk and corresponding flow chart of a kiosk according to one or more embodiments shown and described herein.

FIG. 29 depicts a kiosk and corresponding flow chart of a kiosk according to one or more embodiments shown and described herein. The kiosk 1300 includes in main body 1302 and a plurality of cameras 1306, 1308, 1310 all mounted thereto. The kiosk at 1300 further includes a display 1304 mounted so as to be viewable by a user. A processor 1312 is contained within the kiosk 1300 or accessible via a cloud or other server or spaced away processor or system. In the present embodiment as illustrated in FIG. 29, the camera 1306 is a biometrics camera configured to scan a users face or to gather other biometric data about a user including, but not limited to, retina scans, face scans, infrared information . . . etc.

The processor 1312 is in communication with the plurality of cameras 1306, 1308, 1310, the display 1304 and any other necessary hardware to complete the transaction. As illustrated in the flowchart of FIG. 29, The system is initiated when the user approaches the kiosk. One of the plurality of cameras, most commonly the biometrics camera 1306, detects the user. If using biometrics, a face scan, retina scan or other means is used to detect the user. The face scan or other biometric data is used to connect the user to the user created account within the system. This user created account may contain payment information, shopping history information, favorites, dislikes, biographical information, or any other information commonly created with a typical store account. The user created account may also be associated with a user photograph or other connected image. Once the user is detected, the users data may be used to generate user specific marketing advertising and/or experiences to display to the user. The processor determines what should be displayed, such as advertising, and displays the material to the user on the kiosk. The user is then capable of interacting with the advertisements on the display using gestures, vocal commands, applications, and or physical kiosk display interaction. The processor may display information such as advertisements or products customized when compared and in view of the user created account. Advertisements or products customized may also be displayed based on what is currently within the users shopping cart in the present check out exchange.

In some embodiments, the cameras 1308, 1310 proceeded to detect the items within the users shopping cart. This system uses machine learning and or compares a database available to the processor 1312 and compares the database to determine items located with in the cart. The processor is been configured to collect data to improve accuracy of the system. The processor then generates a list as each item is detected. The list may be displayed on the display 1304 of the kiosk. The user then proceeds to check out by either a user initiated check out, such as a button, or when any of the cameras 1306, 1308, 1310 detect the user walking away. Either of these actions will result in the user created account being automatically charged. The transaction is then complete.

Figure 30:
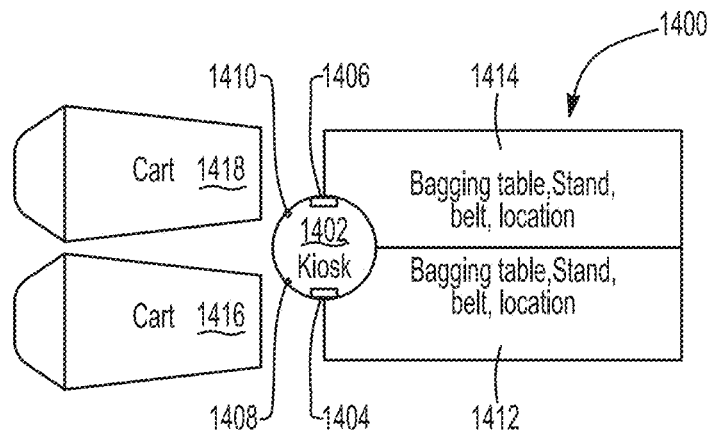
FIG. 30 depicts an exemplary kiosk according to one or more embodiments shown and described herein.
Figure 31:
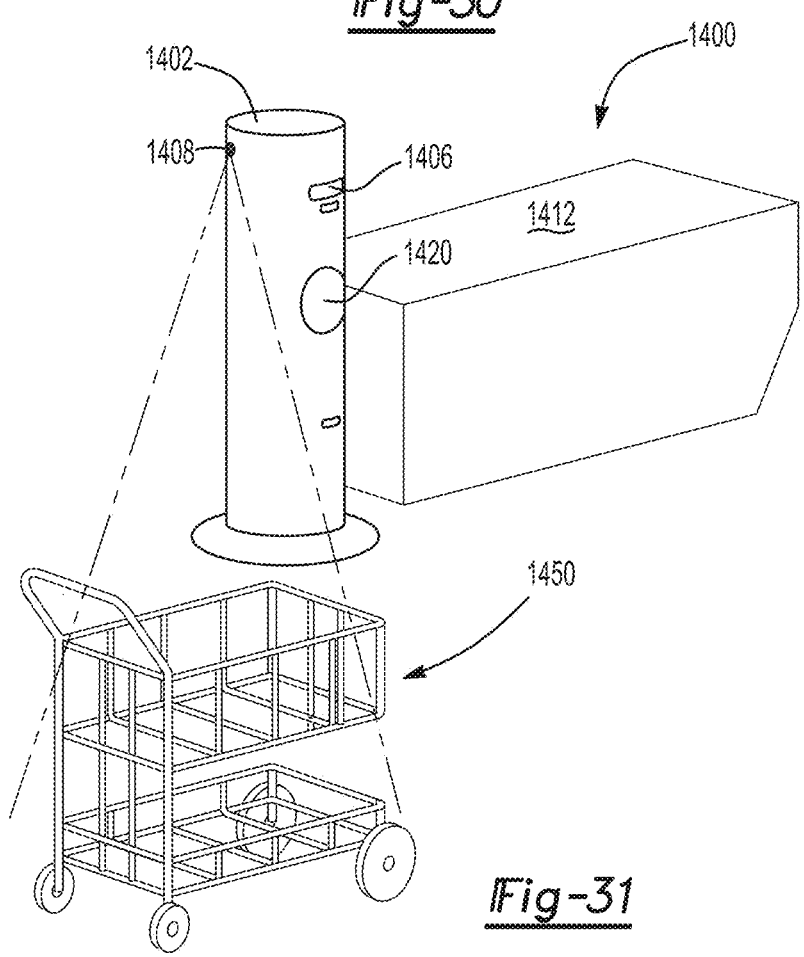
FIG. 31 depicts an exemplary kiosk according to one or more embodiments shown and described herein.

Now referring now to FIGS. 30-31, a checkout kiosk 1400 is provided where in a cart camera 1408, 1410 is utilized to ensure all items contained within a cart 1450 are accounted for. The kiosk 1400 generally includes a main body 1402, it plurality of cameras 1404, 1406, and 80 cart camera 1408, 1410. A bagging table/stand/belt location 1412, 1414 may also be provided along with a display 1420. The camera is 1408, 14 at 10 or configured to point and Ingle down words A bagging table/stand/belt location 1412, 1414 may also be provided along with a display 1420. The camera is 1408, 1410 are configured to point and angle downwards towards a cart 1450, so as to detect if any items are still contained within the cart 1450. If an item or items are still contained within the cart 1450, the processor will audibly and or visually notify the user and or the store that an item is still contained within the cart 1450 so as to prevent theft. For example, if the camera 1408 detects an item in the cart 1450, The processor may aluminate a portion of the kiosk 1400 and or make a loud noise so as to alert a potential theft.

Figure 32:
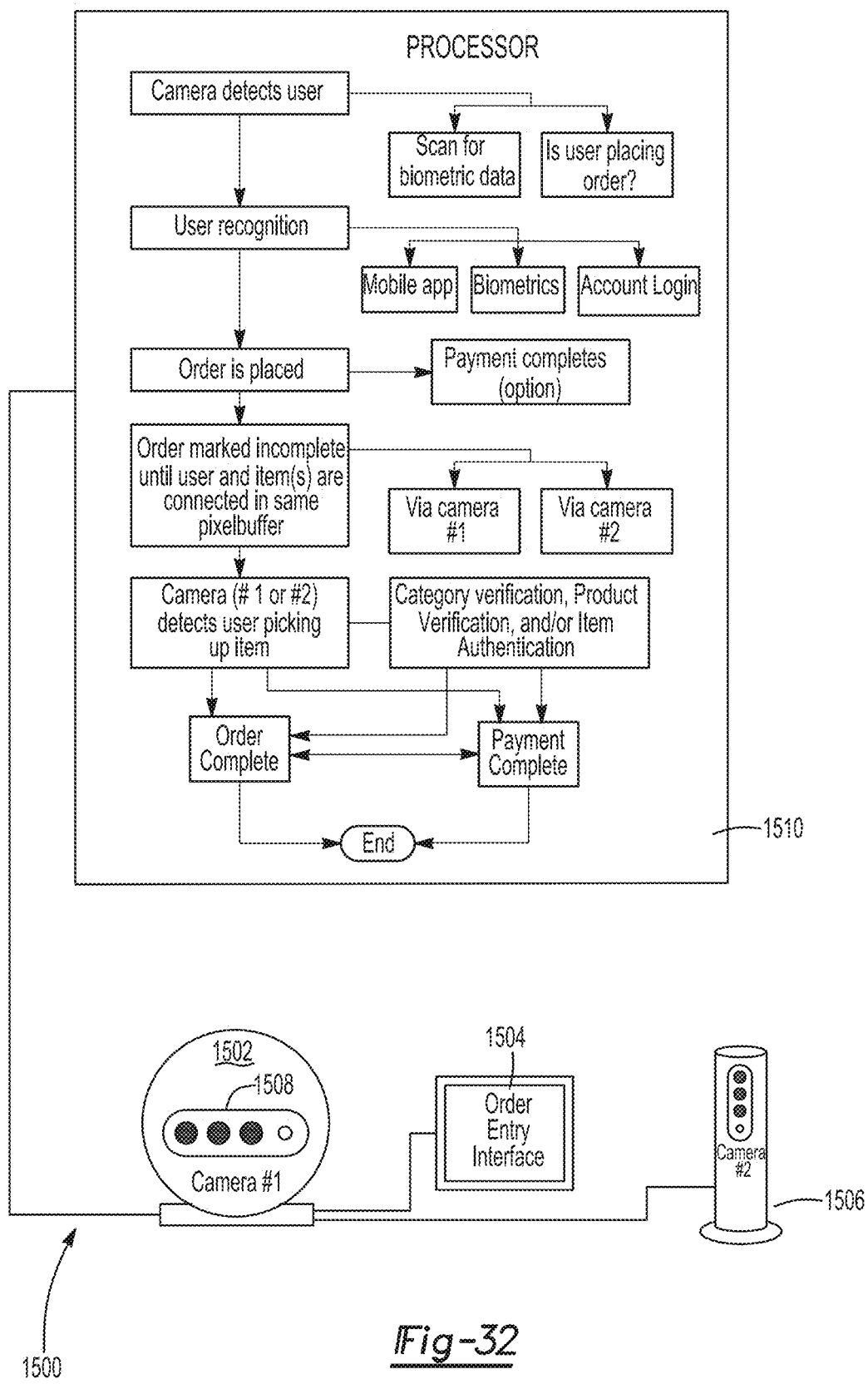
FIG. 32 depicts an exemplary checkout system and corresponding flow chart according to one or more embodiments shown and described herein.

Now referring to FIG. 32, the checkout system 1500 is provided having a first camera 1502 and a second camera 1506. In order entry interface 1504 is also provided. The camera located on the first camera and or the second camera maybe a biometrics camera 1508. A processor 1510 is in communication with the first camera 1502, the second camera 1506 and the order entry interface 1504. The system within the processor 1510 is initiated when the camera to text or user using biometric data and or determining if a user is placing an order. The user is recognized using the mobile application, biometrics and or an account login. After the user places in order either by direct entry or by verbal communication to an employee, the payment may been complete. Alternatively, the payment is complete after the user picks up their item. The order is marked incomplete until the user and the item(s) are connected in the same pixel buffer which may take place using either or both camera 1 and or camera 2. Category verification product verification, and or item authentication then takes place by any of the cameras. Category verification takes place when the processor determines when a user has picked up a general category of goods, such as a size of a beverage. Product verification and/or item authentication occurs by using the machine learning and data comparison systems as described in the aforementioned. The order is then complete or payment is been completed once detection of pick up is confirmed. The order and/or payment may also be completed if either of the cameras detect the user walking away.

It is noted that the terms "substantially" and "about" may be utilized herein to represent the inherent degree of uncertainty that may be attributed to any quantitative comparison, value, measurement, or other representation.

These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter.

Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for processing an order, the system comprising:
    a kiosk;
    an order entry interface connected to the kiosk, the order entry interface configured to accept an order, the order entry interface in communication with a processor;
    a first camera in communication with the processor, the first camera connected to the kiosk, the first camera and the processor configured to detect that a user is placing an order, the first camera directly connected to the order entry interface; and
    a second camera in communication with the first camera and the processor, the second camera physically spaced apart from the kiosk itself;
    wherein the order entered in the order entry interface is marked incomplete until the user and the ordered item are detected in the same pixelbuffer by either the first camera or the second camera, the system then utilizes pixelbuffer comparison of items imaged in real time compared to a database of machine learned images;
    wherein the system continues to collect images to continuously improve the accuracy of the system and the detection of products; and
    wherein the second camera is an existing security camera in a store.

2. The system of claim 1 wherein the first camera and/or the second camera is a biometrics camera.

3. The system of claim 1 wherein payment is complete after the user places an order.

4. The system of claim 1 wherein the system determines that payment is complete when either the first camera or the second camera detects that the user moves away from either the first camera or the second camera.

* * * * *